Dec. 15, 1959    C. A. NERACHER ET AL    2,917,141
POWER TRANSMISSION
Original Filed May 15, 1940    10 Sheets-Sheet 1
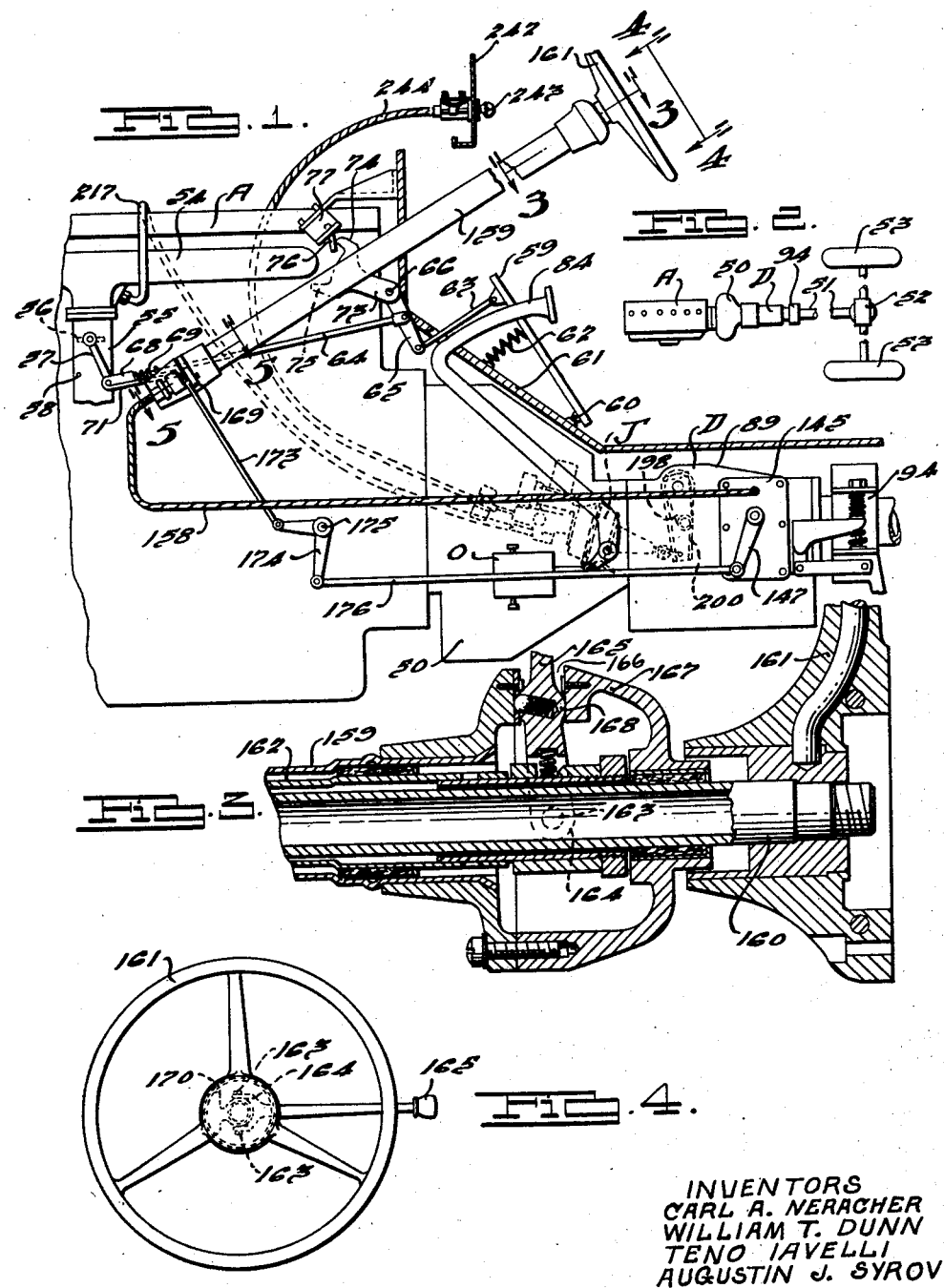
INVENTORS
CARL A. NERACHER
WILLIAM T. DUNN
TENO IAVELLI
AUGUSTIN J. SYROVY.
BY
ATTORNEYS.

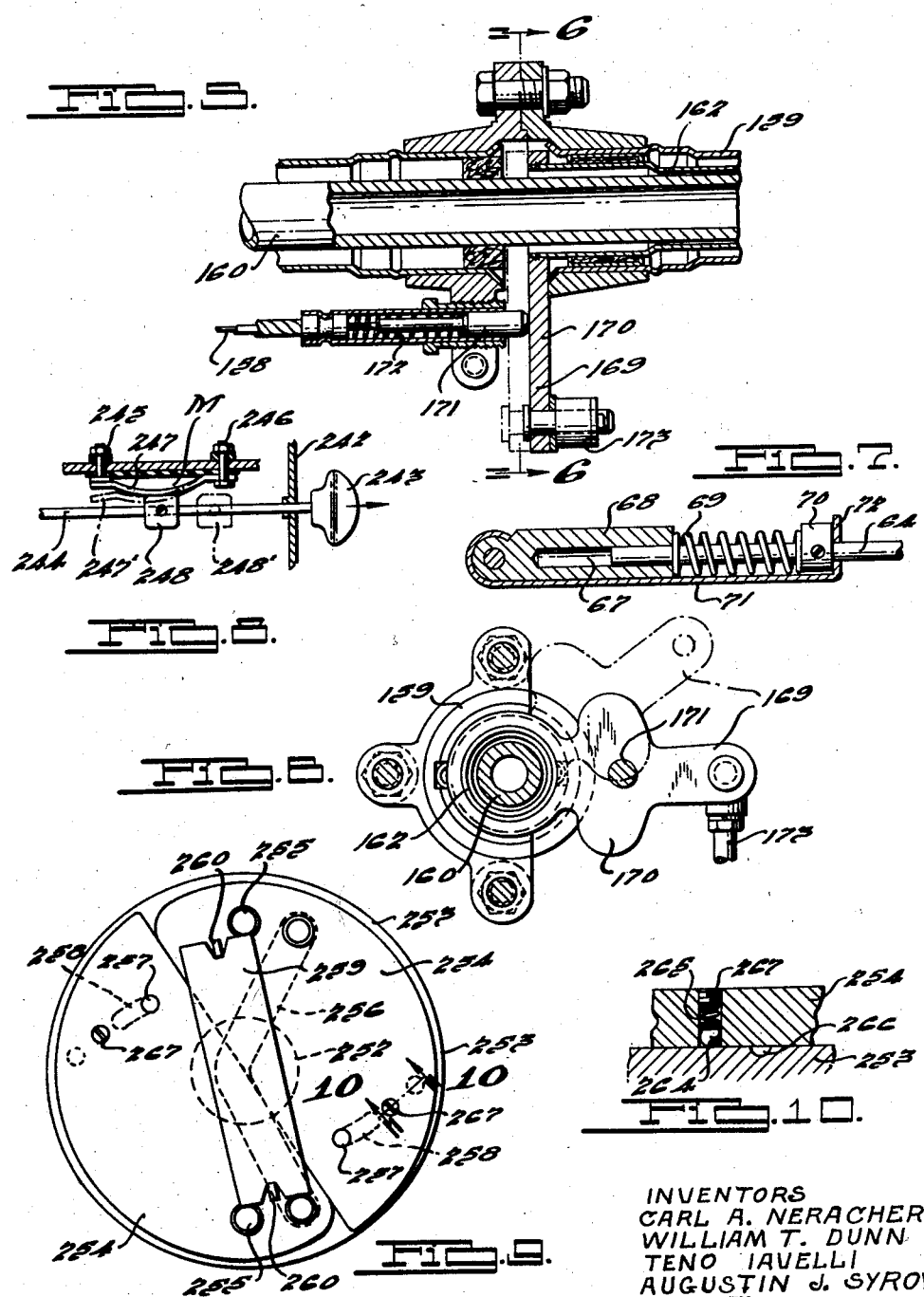

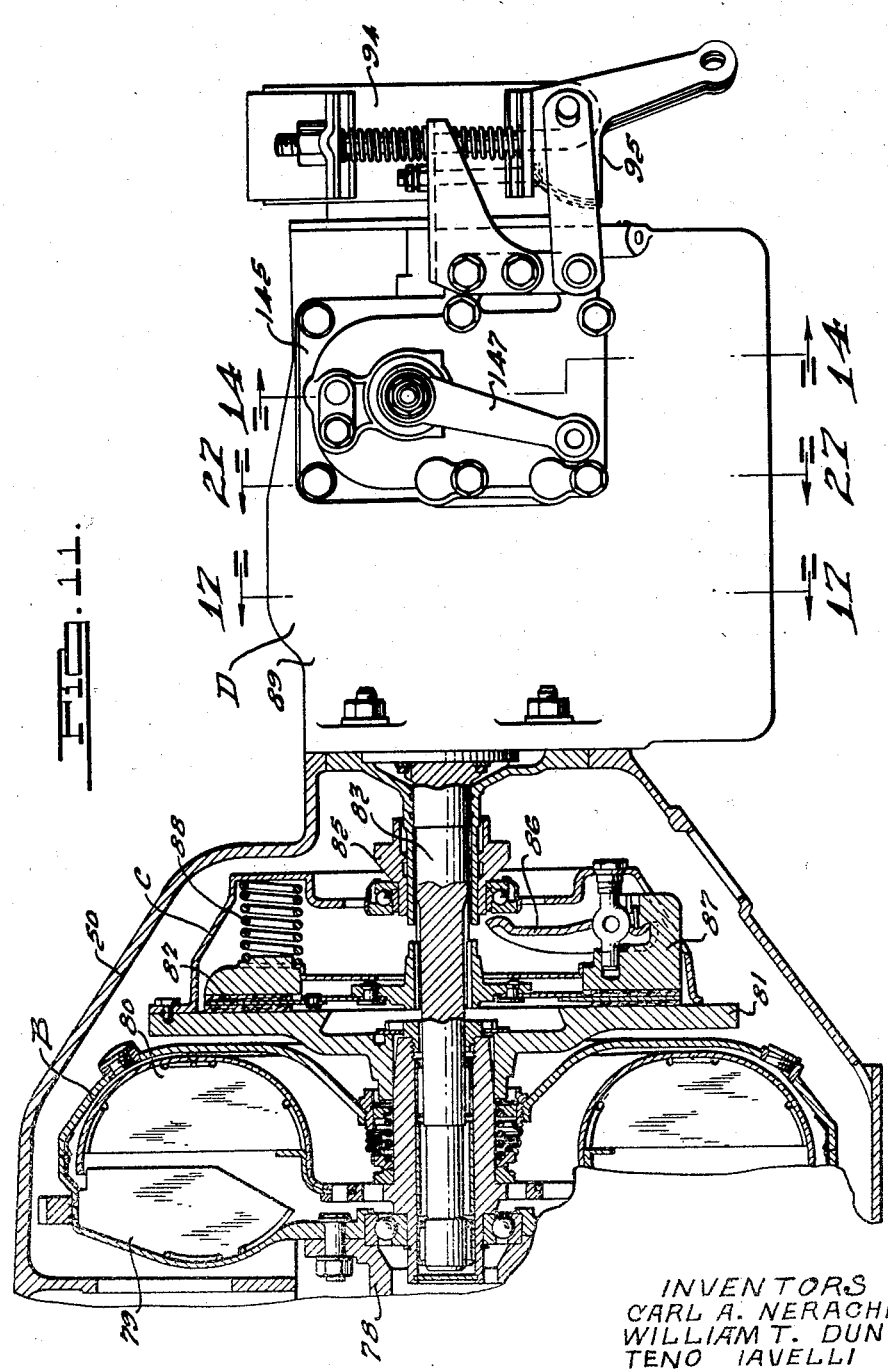

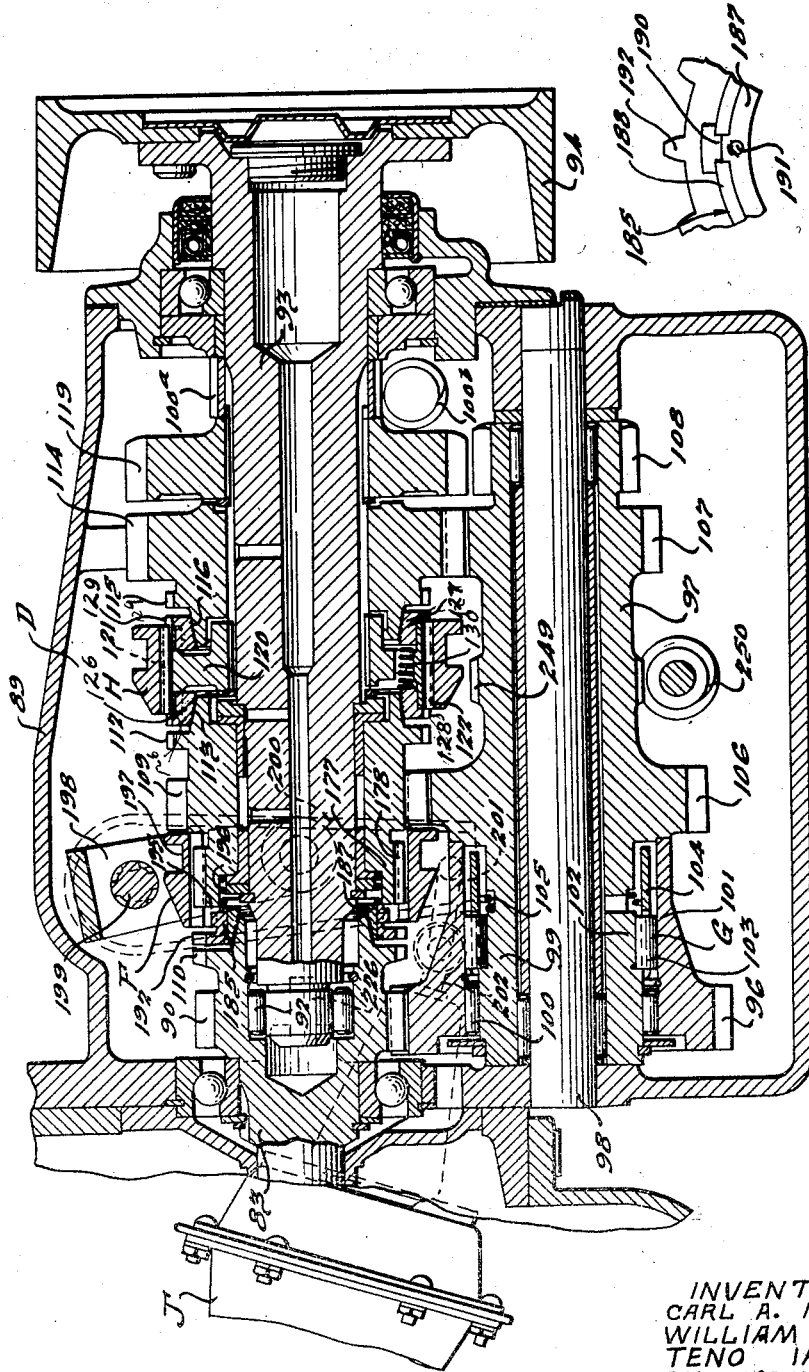

INVENTORS
CARL A. NERACHER
WILLIAM T. DUNN
TENO IAVELLI
AUGUSTIN J. SYROVY
BY
ATTORNEYS.

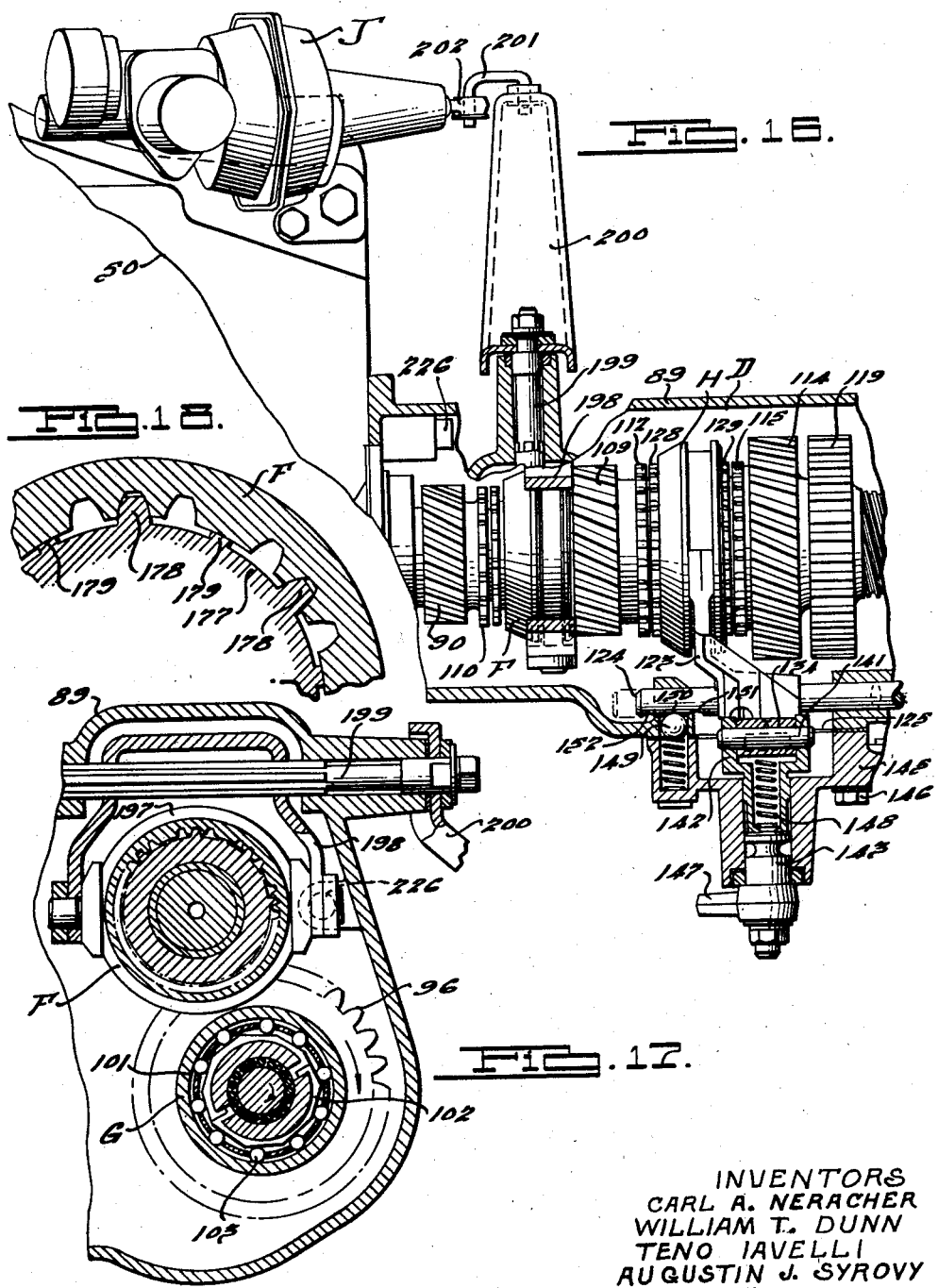

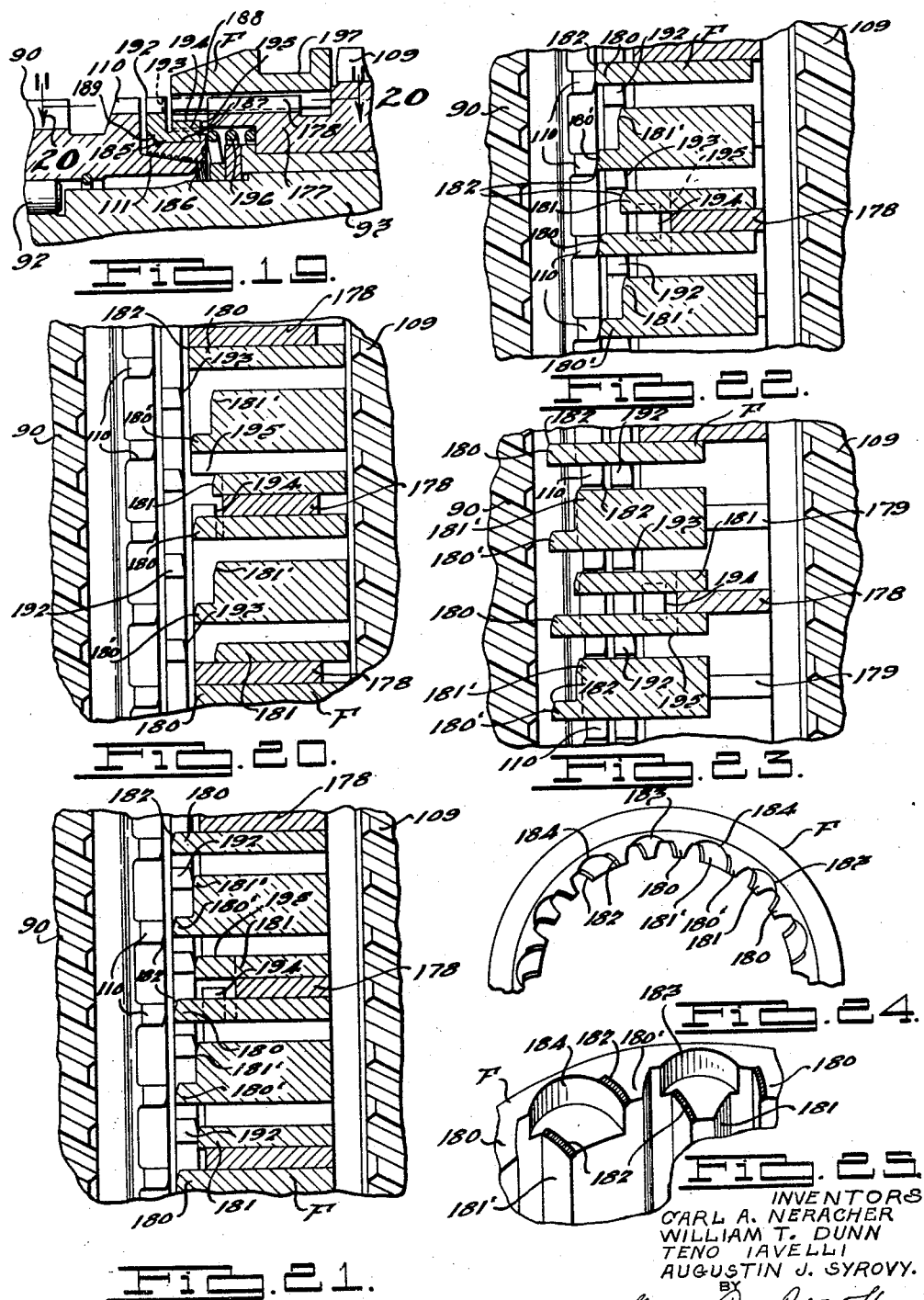

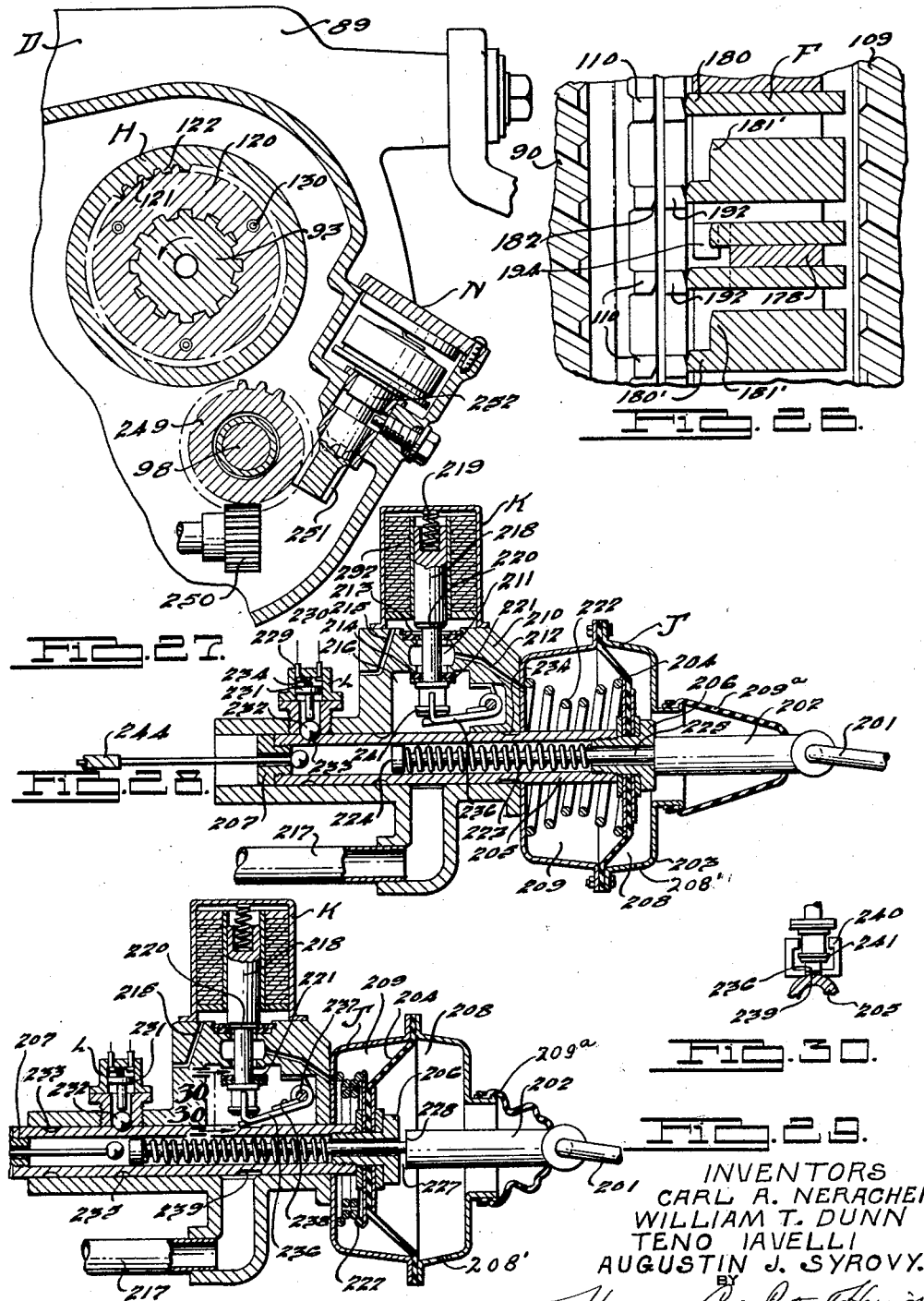

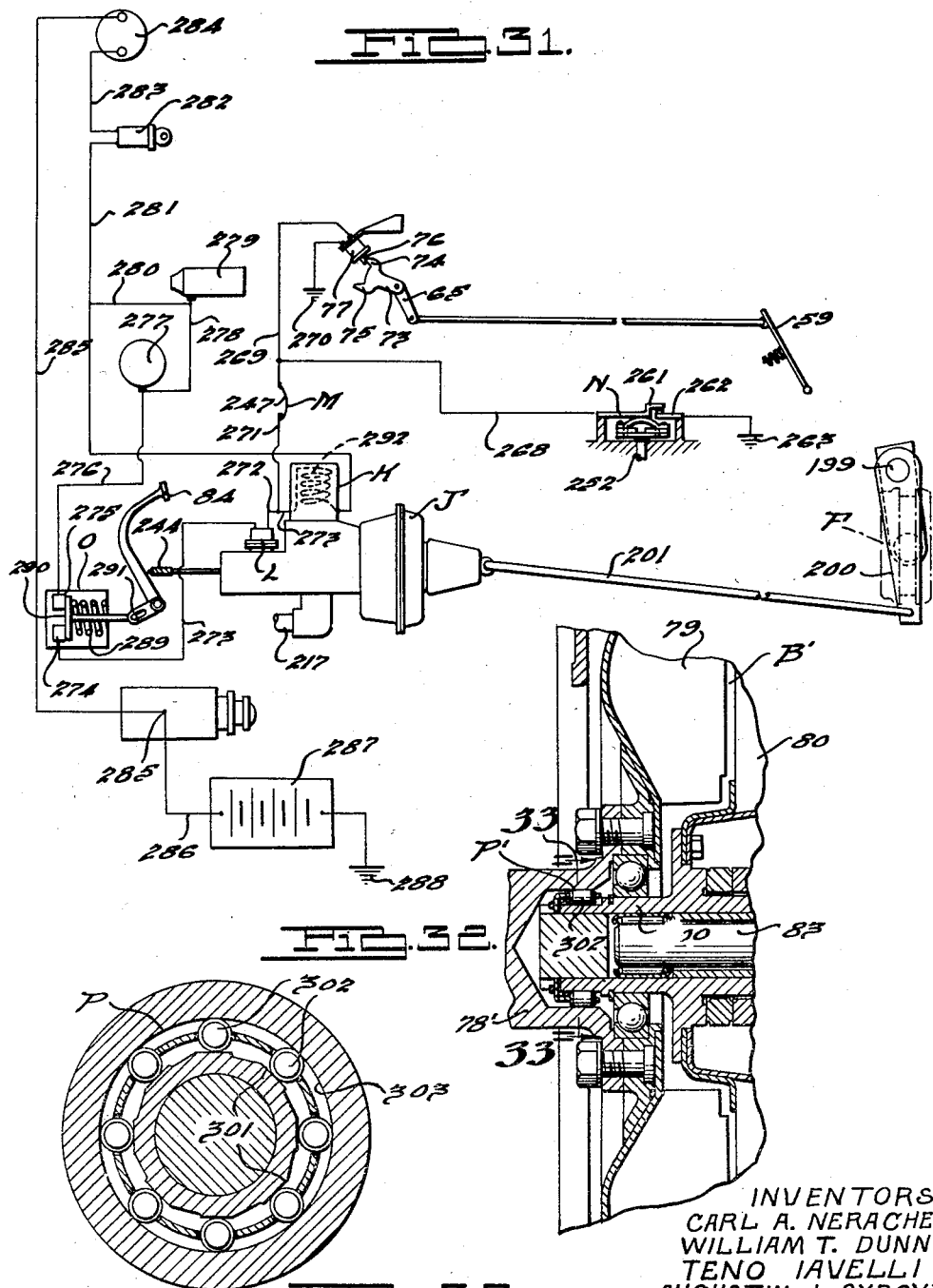

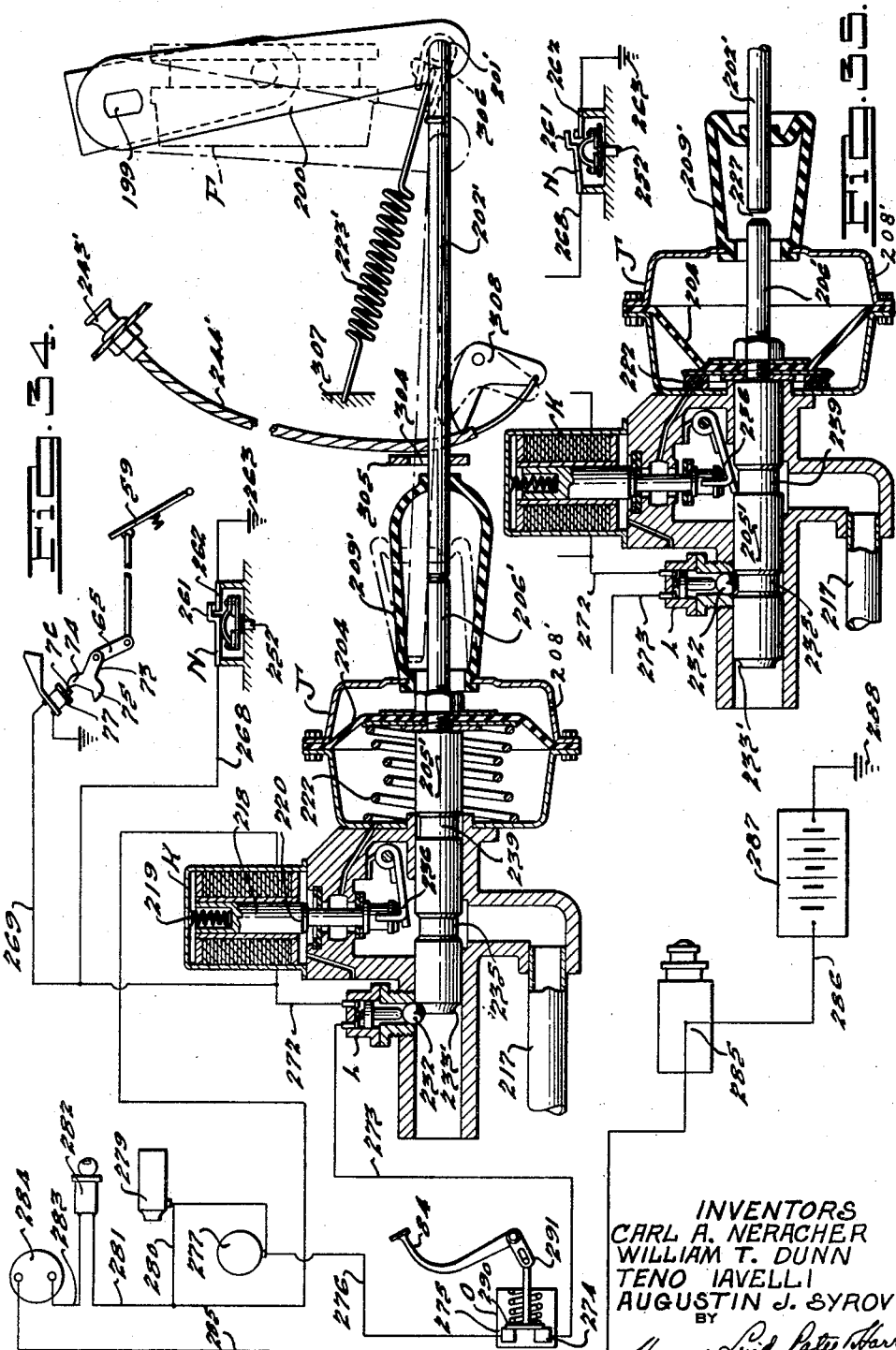

United States Patent Office 2,917,141
Patented Dec. 15, 1959

2,917,141

POWER TRANSMISSION

Carl A. Neracher, William T. Dunn, Teno Iavelli, and Augustin J. Syrovy, Detroit, Mich., assignors to Chrysler Corporation, Highland Park, Mich., a corporation of Delaware Original application May 15, 1940, Serial No. 335,310, now Patent No. 2,455,943, dated December 14, 1948. Divided and this application June 17, 1941, Serial No. 398,452

57 Claims. (Cl. 192—.092)

This invention relates to power transmissions and refers more particularly to improved driving systems for motor vehicles.

This application is a division of our copending application, Serial No. 335,310, filed May 15, 1940, now Patent No. 2,455,943, granted December 14, 1948.

It is an object of our invention to provide a transmission system affording improved characteristics of change speed control with a comparatively simple mechanism capable of long life.

Another object of our invention is to provide a transmission affording improved means for changing speed ratios through the medium of positively engaging clutch means having synchronous control for insuring clutching without shock or ratcheting noise.

A further object is to provide an improved system of vehicle drive incorporating both manual and automatic change speed control affording improved vehicle driving functions.

We have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of torque multiplication and other power transmitting characteristics. Our driving mechanism affords improved quietness and smoothness of car operation and facilitates manipulation of the car especially under close traffic conditions.

We preferably employ a relatively fast axle such that when the transmission is in direct the overall drive is the practical equivalent of an overdrive without driving through gear trains at such time. This is practically obtainable without sacrificing car performance by our improved synchronous clutching means which automatically responds to manipulations of the accelerator pedal for stepping the speed ratio up or down.

With our transmission it is practicable for the driver to stay in a selected speed ratio setting while stopping and thereafter obtain rapid car starting accelerations under favorable torque multiplication and faster ratio boulevard or country drive conditions without operating clutch pedal or gear shift lever.

We have provided a manual selection of high and low ranges in our transmission but in most instances the low range is, by preference, in the nature of an emergency low and when the fluid coupling is employed, very desirable car accelerating characteristics are obtained by manual selection of the high range.

According to the present embodiment of our invention, we have provided a transmission employing countershaft gearing and providing four forward speeds and reverse. Manual selection may be made to high and low ranges in each of which an automatic shift occurs to a faster drive ratio and back to the selected range, the automatic shifting being effected by natural functional manipulations of the accelerator pedal.

In one embodiment of our invention we have provided a speed responsive control on the automatic shift means controlling this shift in a novel manner.

A further object of our invention is to provide an improved power operating system for controlling the operation of the automatic change speed means, this system being relatively simple in construction and of rugged structure such that it may be manufactured at relatively low cost and depended on for reliable service over a long period of usage. To these ends we prefer to employ pressure fluid as the operating medium for the automatic change speed means and in the present embodiment the fluid medium which we employ is air pressure preferably derived for convenience by utilizing the engine intake suction or "vacuum" as it is commonly called.

Additional features of our invention are found in the provision of many features of improved construction and functional operation which will be more apparent from the following illustrative embodiments of the principles of our invention, reference being had to the accompanying drawings in which:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is a sectional view along line 5—5 of Fig. 1 showing a portion of the remote control shift.

Fig. 6 is a detail sectional view taken as indicated by line 6—6 of Fig. 5.

Fig. 7 is a detail sectional elevational view of a portion of the engine throttle operating mechanism shown in Fig. 1.

Fig. 8 is an enlarged sectional view of the electrical switch controlled by the driver when manually operating the automatically shiftable clutch sleeve.

Fig. 9 is a plan view showing the governor.

Fig. 10 is a detail sectional view taken as indicated by line 10—10 of Fig. 9 and showing a portion of the governor.

Fig. 11 is an enlarged side view partly in section and partly in elevation showing the Fig. 1 power transmission.

Fig. 12 is a sectional elevational view through the speed ratio changing transmission which is illustrated in elevation in Fig. 11.

Fig. 13 is a fragmentary view of a portion of the blocker ring.

Fig. 16 is a sectional plan view taken as indicated by line 16—16 of Fig. 14.

Fig. 17 is a sectional view transversely through the Fig. 12 transmisison as indicated by line 17—17 of Fig. 11.

Fig. 18 is an enlarged view of a portion of the automatic shift sleeve as seen in Fig. 17.

Fig. 19 is a detailed enlarged view of the synchronous blocker clutch or coupling mechanism as seen in Fig. 12.

Fig. 20 is a sectional plan view illustrated as a development according to line 20—20 of Fig. 19, the automatic clutching sleeve being released.

Fig. 21 is a similar view showing the automatic clutching sleeve in its intermediate blocked position during the drive blocking condition.

Fig. 22 is a similar view showing the automatic clutching sleeve in its coasting relationship from the Fig. 21 showing, the clutching sleeve being unblocked during coast for its clutching movement.

Fig. 23 is a similar view showing the automatic clutching sleeve in full clutching engagement.

Fig. 24 is an elevational view of a portion of the clutching end of the automatic clutching sleeve.

Fig. 25 is a fragmentary perspective view showing a typical portion of the Fig. 24 sleeve teeth.

Fig. 26 is a view similar to Fig. 20 showing the automatic clutching sleeve in its other intermediate blocked position during coast blocking condition.

Fig. 27 is a transverse sectional view through a portion of the transmission as indicated by line 27—27 of Fig. 11.

Fig. 28 is a sectional elevational view showing the pressure fluid motor and valving control therefor, the latter being positioned to vent the motor.

Fig. 29 is a similar view showing the valving control positioned for pressure fluid operation of the motor.

Fig. 30 is a detail end view of the latching mechanism according to line 30—30 of Fig. 29.

Fig. 31 is a diagrammatic view of the transmission control system.

Fig. 32 is a sectional elevational view of a slightly modified type of fluid coupling which may be substituted for that shown in Fig. 11.

Fig. 33 is a sectional view according to line 33—33 of Fig. 32.

Fig. 34 is a diagrammatic view of a further modification of our invention.

Fig. 35 is a similar view showing certain parts in another position of their operation.

Figure 14:
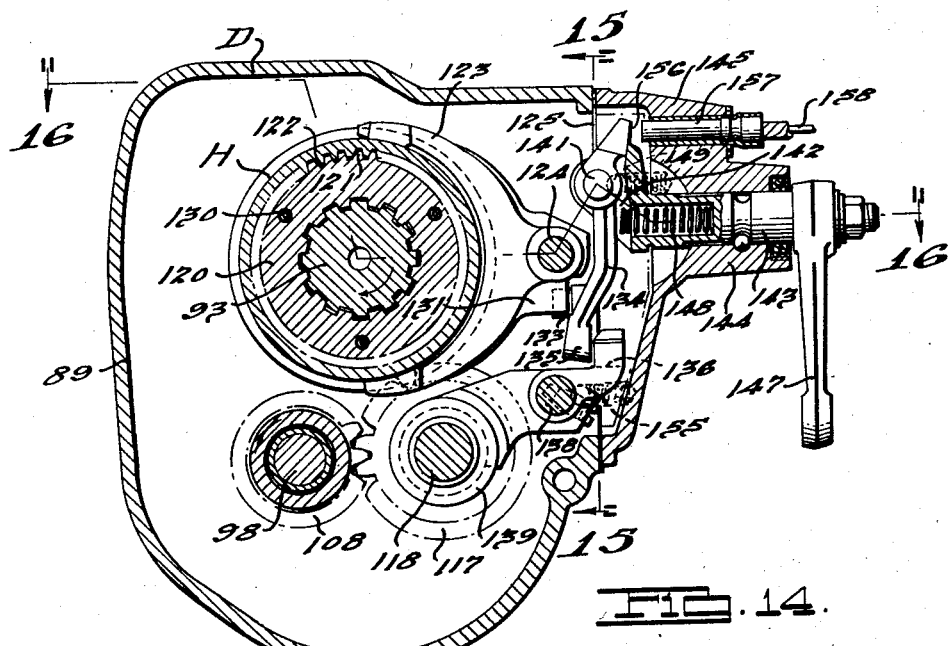
Fig. 14 is a transverse sectional view looking rearwardly as indicated by line 14—14 of Fig. 11, showing the transmission portion of the remote shift mechanism.

We have illustrated the principles of our invention in connection with a motor vehicle drive wherein the usual engine A transmits its drive through clutching means B, C within casing 50, the drive then passing through the change speed transmission D and propeller shaft 51 (Fig. 2) to the differential 52 and thence to the vehicle ground wheels 53 where it is desired to drive the rear wheels according to present day practice.

By preference, the arrangement is such that a "faster" rear axle ratio is afforded than is generally customary so that when the transmission is in direct drive, the car is driven in the equivalent of an overdrive ratio between the engine A and wheels 53. Our arrangement provides such conveniently operable kickdown or step-down shift to a reduction drive from direct that the aforesaid arrangement is practicable thereby obtaining advantages of economy, long life and quietness of operation without the disadvantages of sluggish operation especially for city driving conditions.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The link 64 operates lever 57 through a lost motion device (Fig. 7) serving to normally connect these parts as a solid member but affording thrust of link 64 forwardly after lever 57 has engaged its limiting stop 58 to effect the kickdown control on the transmission. Thus, link 64 has its forward end slidable in guide 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yielding of spring 69 while the throttle valve remains fully open. On release of the accelerator pedal, springs 69 and 62 both act until collar engages the rear flange 72 of bracket 71 and thereafter, throughout the normal range of throttle adjustment, spring 62 alone serves to restore pedal 59 and close the throttle valve.

The kickdown range of accelerator pedal movement is utilized to momentarily unload the engine of its drive, as by shorting the ignition, and to effect disengagement of the synchronous clutch sleeve for a change in the transmission from direct to underdrive accommodated by unloading the clutch sleeve of the engine drive. The throttle being open will cause the engine to rapidly speed up as soon as the ignition circuit is restored, the underdrive being automatically effective as will presently be more apparent.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77. The ignition circuit, after interruption during kickdown, is not dependent for restoration on release of the pedal 59 but is restored by other means presently described.

We preferably transmit the drive from the engine A to transmission D through clutch means comprising a fluid coupling B of the kinetic type preferably in conjunction with a releasable clutch C of a conventional design primarily employed to facilitate manual shifts in transmission D.

The engine crankshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 83 and is drivingly disengaged by depressing a clutch pedal 84 (Fig. 1) which slides throwout 85 forwardly to operate levers 86 to unload driving pressure plate 87, springs 88 loading this plate and engaging the clutch when pedal 84 is released.

Shaft 85 extends rearwardly into the housing or casing 89 of transmission D (Fig. 12) where it is formed with a main drive pinion 90. The drive pinion 90 is hollow and journals, by a bearing 92, the forward end of the transmission driven shaft 93 which may carry a propeller shaft brake drum 94 having the braking mechanism generally designated at 95 operably associated therewith. The drive pinion 90 is cotninuously meshed with a gear 96 for driving the countershaft cluster 97 rotatable on a countershaft support 98. The cluster 97 has a forward extension 99 journalled at 100 within gear 96 and between these parts 99 and 96 there is provided an overrunning clutch G (Figs. 12 and 17). The usual speedometer drive gears are shown at 100ª fixed to shaft 93 and 100ᵇ for driving the usual speedometer cable.

The clutch G comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch G engages when as viewed in Fig. 17, the gear 96 tends to rotate clockwise faster than extension 99. A cage 104 positions the rollers 103 in proper spacing, a spring 105 yieldingly urging the rollers in the direction of their engagement as is customary in overrunning clutches.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. The gear 109 has a forward extension carrying a set of external driven teeth slidably fitting internal clutch teeth of the synchronous coupling sleeve F so that this sleeve is, as will be presently more apparent, adapted to turn with transmission output or driven shaft 93 but may slide forwardly from its Fig. 12 position relatively to the driven shaft. Gear 109 has a rearward extension formed with a set of clutch teeth 112 and a friction cone clutch member 113 and drive pinion 90 also has a rearward extension formed with a set of external clutch teeth 110 and a friction cone clutch member 111.

The gear 107 is constantly meshed with a low speed gear 114 freely journalled on driven shaft 93 and having a forward extension formed with clutch teeth 115 and cone clutch member 116. The reverse gear 108 is adapted to mesh with a reverse idler gear 117 (Figs. 14 and 15) when the latter is slid forwardly on its countershaft 118. At such time the idler 117 also meshes with a gear 119 fixed on the driven shaft 93.

The arrangement is such that shaft 93 may be selectively clutched at the will of the driver with gears 114 and 109, the control preferably comprising a manual remote shift of any suitable type and construction. The operation of clutch sleeve F is, on the other hand, automatic in its operation of clutching the driving shaft 83 with gear 109 and for disconnecting these parts. The manual clutching control comprises the following mechanism.

Fixed to driven shaft 93 is a hub 120 (Figs. 12 and 14) formed with external teeth 121 slidably engaged with the internal teeth 122 of the shiftable clutch sleeve H adapted for forward and rearward shift by a yoke 123 fixed to a longitudinally extending shift rail 124 disposed to one side of shaft 93 adjacent the side opening 125 of casing 89.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urge them into engagement with cones 113 and 116 respectively so that the blocker teeth 128, 129 are misaligned with the sleeve teeth 122 thereby preventing shift of sleeve H as long as the parts to be clutched are rotating at different speeds. The synchronizing blocker rings are more fully described and claimed in the copending application of O. E. Fishburn, Serial No. 180,840, filed December 20, 1937, now Patent No. 2,333,165 granted November 2, 1943, and, if desired, any commercial well-known type of blocker synchronizers may be employed to control shift of sleeve H.

When sleeve H is moved forwardly, teeth 122 engage the cammed ends of blocker teeth 128 thereby urging the blocker under pressure engagement with cone 113 to synchronize gear 109 with shaft 93 (clutch C being released during manual shift of sleeve H to facilitate the clutching action). Then the blocker 126 will rotate slightly relative to hub 120 to permit the sleeve teeth 122 to pass through blocker teeth 128 to engage teeth 112 to positively clutch shaft 93 with gear 109. The rearward shift of sleeve H to clutch with teeth 115 of gear 114 is synchronously effected under control of blocker 127 in the same manner.

The yoke 123 is provided with a boss 131 below shaft 124 (Figs. 14 and 15), this boss having a slot 132 adapted to be engaged by an inwardly extending pin 133 carried by a lever 134. This lever has a lower end 135 adapted to engage a slot 136 of a yoke 137 fixed to the reverse shift rail 138 parallel to and below rail 124. The yoke 137 engages the collar portion 139 of the shiftable reverse idler gear 117. Rails 124 and 138 are interlocked by plunger 140 to prevent their simultaneous displacement.

Figure 15:
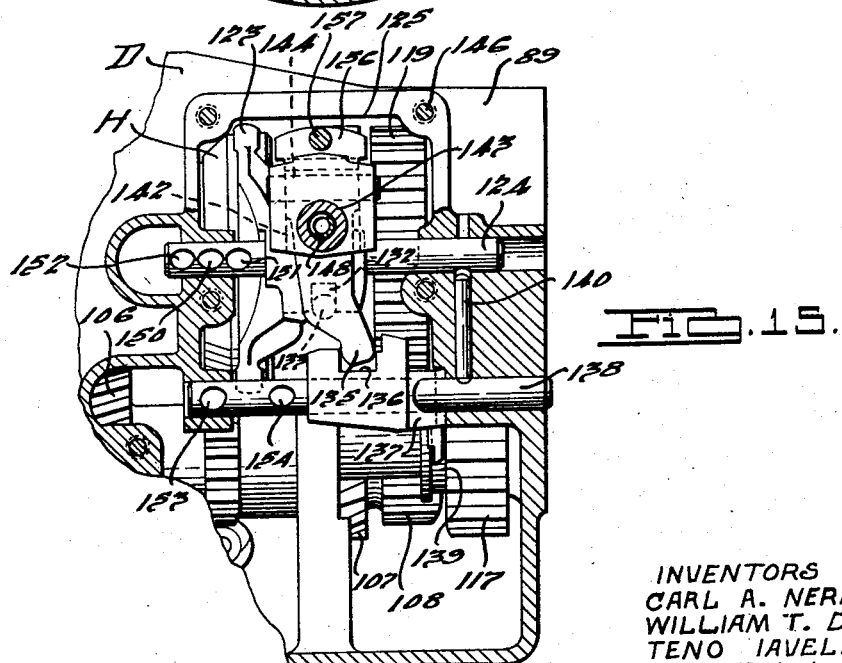
Fig. 15 is a detail sectional view taken as indicated by line 15—15 of Fig. 14.

Lever 134 is supported between its ends by a pin 141 parallel to and above rail 124, this pin being carried by the yoked inner end 142 of a shaft 143 rotatably mounted in the boss 144 of a cover 145 secured by fasteners 146 to the opening 125 of casing 89. The shaft 143 has its axis extending across the axis of movement of the rails 124 and 138 and has a lever 147 fixed to its outer end outside of the cover 145. A spring 148 reacts on shaft 143 and yieldingly urges lever 134 clockwise (Fig. 14) about pin 141 tending to maintain pin 133 engaged in slot 132, and end 135 free from slot 136. A spring pressed ball detent 149 yieldingly maintains rail 124 in neutral, forwardly (to clutch sleeve H with teeth 112) or rearwardly (to clutch sleeve H with teeth 115) by engagement of this ball detent with the rail recesses 150, 151 and 152, respectively. The reverse rail 138 has neutral and reverse positioning recesses 153, 154 respectively engaged selectively by a spring pressed ball detent 155 (Fig. 14).

The upper end of lever 134 has a wide face 156 engageable with the inner end of a plunger 157 slidable inwardly through cover 145 by a Bowden wire operating mechanism 158. When the wire 158 is pushed, the plunger 157 engages lever face 156 to swing the lever 134 so that the end 135 engages slot 136 while pin 133 disengages slot 132. In such position, the shaft 143 may be rotated to shift rail 138 to mesh reverse idler 117 with gears 108 and 119 for the reverse drive. The plunger 157 maintains a sliding engagement with lever face 156 during this rotation of shaft 143. The remote control mechanism for effecting control of lever 147 and Bowden wire 158 will now be described (Figs. 1 and 3–6).

The fixed steering post 159 houses the usual steering shaft 160 operated by hand steering wheel 161. Rotatably journalled within post 159 is a hollow shaft assembly 162 connected by pivot pins 163 with the yoked inner end 164 of the manually operable selector element or shift lever 165 which extends outwardly through an arcuate opening 166 formed in the head 167 fixed to post 159. Movement of lever 165 fore and aft about the axis of shaft 162 will oscillate this shaft while movement of the lever up and down will rock the lever about a fulcrum 168 to cause reciprocation of shaft 162 in the direction of its axis.

At the lower end of shaft 162 there is a lever 169 fixed thereto, this lever having an intermediate wide face portion 170 always engaged by the upper end of a plunger 171 fixed to the forward end of Bowden wire 158. A spring 172 operates to yieldingly urge plunger 171 engaged with the lower surface of portion 170 and plunger 157 positioned as in Fig. 14 free of lever face 156. A link 173 has its forward end pivotally engaged with the outer end of lever 169, the rear end of this link being connected with a bell crank lever 174 mounted on engine A at 175. The bell crank operates a second link 176 which has articulated connection with lever 147.

In order to shift sleeve H into engagement with the teeth 115 of the low speed drive gear 114, the operator disengages the main clutch C by depressing pedal 84, and then swings lever 165 forwardly or counterclockwise from neutral as viewed in Fig. 4. This pushes the lever 147 for rearward swinging movement serving to shift rail and sleeve H rearwardly. Pedal 84 is then released for the low drive. Shift of lever 165 rearwardly will slide rail 124 and sleeve H forwardly to clutch with the teeth 112 of the gear 109 to obtain the third speed ratio of the four available forward speeds.

In order to effect the reverse drive, the lever 165 is first rocked upwardly in neutral to thereby push downwardly through shaft 162 to cause lever portion 170 to operate through the Bowden wire 158 to swing lever 134 to engage lever end 135 with slot 136. Then the lever 165 is shifted rearwardly to cause lever 147 to rock the lever 134 to effect forward shift of rail 138 and idler 117 into mesh with gears 108 and 119. The clutch C is preferably released to effect manual shifts of sleeve H and reverse idler 117.

Blocking means is provided to limit forward shift of clutch sleeve F whenever shaft 83 and gear 109 are rotating at different speeds, the blocking action being such that the sleeve F will clutch only when the engine is coasting. The details of the blocking means is best shown in Figs. 18–26, the arrangement providing improved and simplified blocker action.

The forwardly projecting end 177 of gear 109 is externally toothed at 178, there being spaces of triple-tooth width between the successive driven teeth 178 (Fig. 18) provided midway across the spaces with pilot lands or ribs 179. The clutch sleeve F has internal teeth preferably formed in a repeating pattern best shown in Figs. 20–26. The teeth are formed so that every other tooth of the series extends forwardly axially beyond the teeth adjacent thereto so that, for convenience of reference, the teeth may be said to be relatively long or relatively short although obviously the rear ends of the teeth need not be circumferentially aligned as these rear ends have nothing to do with the clutching action. Therefore the reference herein to relatively long or short teeth has reference to the clutching ends of the teeth of sleeve F and not necessarily the relative total axial lengths of the teeth which may be relatively varied as desired.

In addition to providing the repeating pattern of alternate long and short teeth, at least one adjacent pair of these teeth are circumferentially connected or bridged together such that the space which would normally occur between these bridged teeth is closed against passage of the clutching teeth 110 therebetween. This arrangement protects the teeth from damage during clutching and also insures clutching free from jolts and shocks to the car occupants as well as to the transmission mechanism as will presently be more apparent. In actual practice, for symmetry of balance and machining, the bridged teeth preferably occur at repeating intervals circumferentially such that between each pair of bridged long and short teeth is a pair of normally spaced or disconnected long and short teeth.

In the drawings the disconnected pairs of long and short teeth 180, 181 respectively, are so spaced that between each of these pairs of teeth there is a pair of the bridged long and short teeth 180′ and 181′. The bridged teeth are identical with teeth 180 and 181 except that the space between the latter is occupied by the connecting or bridging portions of the body of sleeve F. The leading edges of the rear ends of teeth 110 and the trailing edges of the forward ends of long teeth 180, 180′ and short teeth 181, 181′ are chamfered or bevelled at 182 to facilitate their clutching and we have found that approximately 15° chamfer angle is satisfactory.

As an improvement in the manufacture of the sleeve F we form the teeth just as shown in Fig. 20 except that all teeth terminate in a common plane at their front ends (as viewed in Fig. 20) and without any chamfer. Then we cut back every other tooth with a circular cutter which forms the cuts at 183 and 184 (best shown in Figs. 24 and 25) thereby forming the short teeth 181, 181′. The chamfers 182 are then formed.

A blocker ring 185 (Figs. 12, 13 and 19) lies between the gears 109 and 90 and comprises a friction cup clutching surface 186 which may be formed as a fine thread, preferably of left hand and in the neighborhood of forty threads per inch as disclosed in the aforesaid Fishburn application, or plain if desired, to engage the surface of cone 111 to obtain the blocker action. The surface 186 is carried by an inner ring part 187 of bronze or the like which fits within an outer ring part 188. Part 187 has a forward outwardly extending shoulder 189 which seats within a counterbore of the part 188. At the rear the part 188 has a series of notches 190 (Fig. 13) into which a portion of the part 187 is forced to lock the parts together by staking at 191 prior to machining of the ring 185. The part 188 is formed at its forward end with upstanding blocker teeth 192. The trailing portions of the faces of teeth 192 which are presented toward the forward ends of the teeth of sleeve F may be bevelled at 193 to facilitate clutching of sleeve F to start a dead engine by towing the car, as will be presently more apparent. Where the bevels 193 are employed, we have determined that a 7° angle of the bevel provides the desired result without interfering with the normal functioning of the parts. The blocker ring 185 rotates with the driven shaft 93 and sleeve F with relative rotation accommodated so that blocker teeth 192 may move between the drive blocking position of Fig. 21 and the coast blocking position of Fig. 26.

The blocker ring drive is provided by a plurality of upstanding lugs 194 formed as a part of ring 185. Ordinarily two lugs are sufficient, disposed at diametrically opposite points. The forward edge of the driven gear extension 177 is cut or notched at 195 to receive a lug 194 with sufficient clearance circumferentially to allow the blocker teeth 192 to rotate relative to the sleeve teeth within the aforesaid limits. A relatively light spring 196 may be provided between the gear 109 and blocker ring 185 to urge the blocker surface lightly into frictional energizing engagement with cone 111 so that the blocker ring tends to rotate with driving shaft 83 thereby placing the blocker ring in one of its two blocking positions prior to forward shift of sleeve F whenever gears 90 and 109 are asynchronous.

From the foregoing it will be apparent that whenever the speeds of shaft 83 and gear 109 are different from each other, the blocker ring 185 will move into position to block forward shift of sleeve F. In Fig. 20, the sleeve F is in its disengaged rearward position, the blocker ring tending to lead the driven gear 109 and sleeve F which is the condition when the gear 109 is rotating slower than the driving shaft and when the sleeve is not urged forwardly. When gear 109 rotates faster than the driving shaft, as when the engine coasts, then the friction drag at cone 111 drags the blocker ring rotatably backwards (counterclockwise looking front to rear) with the driving shaft until the lugs 194 engage the ends of slots 195 opposite to the end engaged in the Fig. 20 showing. At this time the blocker teeth are at their positions shown in Fig. 26 ready to block the long sleeve teeth 180, 180′. In either instance forward clutching shift of sleeve F is blocked by the blocker teeth 192.

The arrangement is such that the sleeve will not shift forwardly of the blocker teeth 192 except when the engine is allowed to coast from a previous condition of drive. Therefore, whenever the engine is driving the car and the sleeve F shifts forwardly, the sleeve will be blocked against ratcheting with teeth 110. Furthermore, clutching of sleeve F is limited to coasting down of the engine to synchronism with teeth 110 from a condition where the engine and teeth 110 were rotating faster than the sleeve F and gear 109.

In order to pilot the sleeve F against tilting or tendency to bind as it shifts forwardly to reach the teeth 110, we have provided the aforesaid pilot ribs or lands 179 which slidably support the sleeve at the bridged portion of teeth 180', 181'. The sleeve is thus piloted independently of teeth 178 which is of advantage because necessary tooth-backlash would prevent a close piloting of the sleeve on the teeth 178 alone. With our improved arrangement the sleeve F shifts more freely and has a tendency to fully clutch with teeth 110 during engine coast.

The means for urging sleeve F forwardly will be presently described. However, let us assume that at this time a force is to be applied forwardly to sleeve F while the sleeve is in the Fig. 20 position of release and while the engine is driving the car in a reduction drive ratio, as when the driving shaft 83 is rotating forwardly faster than gear 109 and sleeve F. Under such conditions the blocker 185 will lead sleeve F and the blocker teeth 192 and lugs 194 will be positioned as in Fig. 20. Now as a force is applied to move the sleeve F forwardly, the teeth 181, 181' will strike teeth 192 and further shift of the sleeve will be blocked as long as the engine continues to drive in this drive blocking relationship. This condition is shown in Fig. 21 which may be said to represent an intermediate or blocked position of the sleeve at the time that the sleeve is rotating slower than gear 90. If now the accelerator pedal is released to allow the engine to coast, while gear 109 continues to freely rotate, the shaft 83 and blocker 185 will rapidly slow down together until they synchronize with gear 109. Then, as the shaft 83 starts to drop just slightly below the speed of gear 109, the blocker 185 will lag the sleeve F by an amount equal to half the total travel of lugs 194 which total travel is from the Fig. 20 position to the Fig. 26 position. The half travel is indicated by the position of lugs 194 in Fig. 22. This is necessarily so because of the long teeth 180, 180' the forward ends of which (Fig. 21) axially overlap the blocker teeth 192 so that the blocker lags the sleeve only until these teeth 180, 180' strike the sides of the blocker teeth at this approximately synchronized condition between the shaft 83 and gear 109. As soon as this condition is reached (Fig. 22) the sleeve F moves forwardly so that the blocker teeth 192 pass between adjacent teeth 180, 181' and 180', 181 and the long teeth 180, 180' will strike the ends of teeth 110 and then glance off these teeth assisted by the bevels 182. As the long teeth glance off the teeth 110, the engine coasts down slightly more until the long teeth, now thrust forwardly between teeth 110, strike against the sides of teeth 110 and at this time the engine cannot coast down any more relative to gear 109. Any continued coast of the engine will simply serve as a brake on the car travel or in other words the engine cannot then slow down except as permitted by the car slowing down with it. At this time the sleeve will often move fully forward to its Fig. 23 fully clutched position, especially when our piloting means 179 (Fig. 18) is employed to guide the sleeve F or when a force is applied to the sleeve F which is adequate to compel full clutching of the sleeve during engine coast as aforesaid. If however, the structural relationship and the forces involved are such that full clutching does not result during engine coast, then a partial or primary clutching will nevertheless result and it is just as positive as a full clutching to prevent the engine turning slower or faster than gear 109. Under such conditions, which sometimes even occur interchangeably with full clutching on coast, the secondary full clutching will automatically occur just as soon as the engine is accelerated to cause a reversal of torque between the teeth of sleeve F and teeth 110. At the instant that the teeth are unloaded the sleeve will shift forwardly to the limit of its clutching travel. The long teeth will in any event insure clutching on coast between the sleeve F and gear 90 at approximately a condition of synchronism between these parts.

Now let us assume that the force applied forwardly to sleeve F occurs at a time when the blocker lags the sleeve. Under such conditions the teeth 180, 180' will almost immediately engage blocker teeth 192 (Fig. 26) and the sleeve will be blocked in what may be called the coast blocking condition, Fig. 21 representing the drive blocking condition. The low cam angle at 193 will not be sufficient to cam the blocker forward against the thrust at friction surfaces 111, 186 and, as the main clutch C is engaged, the driving shaft 83 continues to rotate at the assumed speed less than that of the sleeve F and the gear 109. (The main function of the cammed surfaces 193, when the cams are employed, will presently be apparent in conjunction with getting a dead engine started by towing the car.) Now, with the sleeve teeth 180, 180' blocked by the blocker teeth as when the engine is coasting, let us assume that the engine is speeded up by the car driver depressing the accelerator pedal in the usual manner. This will cause the blocker to immediately rotate ahead of the sleeve until lugs 194 engage the leading ends of slots 195 and the sleeve will move forwardly until the parts are positioned as in Fig. 21 with teeth 181, 181' blocked by teeth 192. One function of the short teeth 181, 181' relative to long teeth 180, 180' will now be apparent because when the driver depresses the accelerator pedal to cause the blocker to move ahead of the sleeve F, teeth 192 slide off the ends of teeth 180, 180' but the blocker teeth do not have time to enter the spaces between teeth 180, 181' and 180', 181 because of the forward rotation of the blocker and the cut-back arrangement of sleeve teeth. The blocker teeth therefore jump these spaces and block teeth 181, 180' which are made sufficiently shorter than teeth 180, 180' to insure this action. When the parts assume the Fig. 21 positions, which is the drive blocking condition, then on slowing down the engine, as when the driver releases the accelerator pedal, the clutching of sleeve F with teeth 110 will occur during the coast just as in the foregoing example of a typical clutching of the sleeve.

The automatic control for shifting sleeve F will now be described. This sleeve has a shifting groove 197 engaged by a yoke 198 (Figs. 1, 12, 16 and 17) which is secured to a transversely extending rock shaft 199 to which is fixed the operating lever 200 which extends downwardly outside of the transmission casing 89. A link 201 (Fig. 16) connects the lower end of lever 200 with the rear end of a follower rod 202 of the power operating means preferably in the form of a pressure fluid motor J (Figs. 28, 29). Our arrangement is such that the sleeve F is operated forwardly in its clutching shift by the action of the pressure fluid which acts through the medium of a spring such that the motor may operate ahead of the sleeve clutching and such that only a predetermined shifting force is applied to sleeve F thereby protecting the teeth against damage and insuring uniform conditions of operation for the sleeve.

The motor J, in the present embodiment, is of the so-called vacuum type as the fluid medium acting on the motor piston is air rendered effective by subjecting the piston to the intake manifold of the engine. Thus a chamber or cylinder 203 houses the piston 204 of the diaphragm type, the latter being fixed to a hollow piston rod 205 which has the front and rear abutment members 206, 207 assembled therewith in fixed relationship. Air under atmospheric pressure is unrestrictedly present in the chamber 208 by reason of one or more holes 208' in the casing 203 although if preferred the flexible dirt-seal 209ᵃ may be fitted so that it is not air-tight. The other chamber 209 is selectively placed in communication either with a source of pressure fluid different from atmospheric pressure, such as the intake manifold, or else with the atmosphere when the chamber 209 is to be vented.

The motor housing 210 slidably receives the front end of piston rod 205 and has a chamber 211 which is open to chamber 209 by a passage 212. Upper and lower valve seats 213, 214 define passages for respectively controlling the venting and "vacuum supply" to chambers 211 and 209. When passage 213 is open then the chamber 211 is vented by passage 215 and when passage 214 is open then the chamber 211 is placed in communication with the low pressure region of the engine intake manifold 54 by way of chamber 216 and pipe 217.

In order to control the passages 213 and 214 so that when either is closed the other is open, we have provided an electrical solenoid K having an armature plunger 218 yieldingly urged downwardly by a spring 219. This armature has a lower extension formed with valve parts 220, 221 adapted respectively to engage the valve seats 213, 214 to close and open these passages. In Fig. 28 the solenoid K is shown energized, the armature 218 being raised against spring 219 thereby seating valve 221 and opening valve 220 so as to vent chamber 209 and allow the piston 204 under certain conditions hereinafter set forth to move rearwardly under the action of a spring 222 to release the sleeve F from teeth 110 and cause the sleeve to occupy the Fig. 19 position. This releasing movement of the sleeve is limited by engagement thereof with the side of gear 109 (Fig. 19). In Fig. 29 the solenoid K is shown deenergized, the armature 218 being lowered by spring 219 thereby seating valve 220 and opening valve 221 so as to close the vent and open the vacuum supply to chamber 209. This causes the piston 204 to move forwardly under power, compressing spring 222 and moving rod 205 forwardly or to the left as viewed in Figs. 28 and 29.

In order to provide a yielding power transmission between piston 204 and sleeve F for the clutching shift, a thrust transmitting compression spring 223 is disposed within hollow rod 205 and has one end seated on the abutment 206 and the other end seated on a head 224 of a rod 225 which extends through spring 223 as a forward extension of rod 202. Therefore, when piston 204 is forced forwardly by the action of pressure fluid thereon, rod 202 and sleeve F may move forwardly only to one of the blocked positions of the sleeve (Fig. 21 or 26) while the piston 204 moves on to complete its stroke accommodated by loading spring 223 against head 224. Then at such times that the engine is allowed to coast to synchronize gears 90 and 109, the rod 202 is actuated by the preloaded spring 223 to complete the clutching shift of sleeve F. The forward clutching movement of sleeve F is limited by a stop pin 226 carried by the casing 89 and having its rear end in the path of yoke 198 (Figs. 12, 16 and 17).

In Fig. 29 the rod 202 has moved forwardly to its limit allowed by stop 226, the sleeve F being fully clutched as in Fig. 23, whereas the piston has over-travelled rod 202 to the extent of the gap 227 between abutment 206 and rod 202. When, with the parts positioned as in Fig. 29, solenoid K is energized to vent chamber 209, it will be apparent that rod 202 may remain stationary while spring 222 moves piston 204 rearwardly until abutment 206 engages the shoulder 228 of rod 202. This arrangement is utilized to effect torque reversal or unloading at the engagement of teeth 110 with sleeve F whereby the sleeve may be shifted out of clutching position as will presently be apparent. Therefore, after the piston has closed gap 227 in unloading the teeth of sleeve F, spring 22 thereupon moves the piston 204 to the Fig. 28 position releasing the sleeve F.

The unloading of sleeve F is accomplished by a momentary grounding or shorting of the engine ignition system under control of an ignition interrupting switch L. This switch has terminals 229, 230 open, as in Fig. 28, for normal operation of the ignition system and closed to render the ignition inoperative in conjunction with further controls presently to be described. The switch terminals are bridged and the switch thereby closed by a movable contact 231 in the form of a reciprocable plunger resting on a ball detent 232 which in Fig. 28 is seated in groove 233 of rod 205 thereby allowing switch spring 234 to hold contact 231 away from the terminals 229, 230.

When the piston 204 is in the limit of its pressure fluid operated stroke (Fig. 29) a second groove 235 receives ball 232 to allow switch L to remain open. However, whenever the piston moves between the Fig. 28 and Fig. 29 positions, the switch L is closed and, depending on other conditions, the ignition may then be interrupted. Thus, when the motor J in Fig. 29 is vented, the piston in taking up gap 227 will cause switch L to close, the switch opening again at the completion of the rearward stroke of the piston.

The following mechanism is provided in order to latch the sleeve operating means in clutch-urging position so that once the motor J has been operated by pressure fluid to clutch the sleeve F, the sleeve will not thereafter disengage upon loss of pressure fluid. This mechanism also allows the pressure fluid to load the sleeve operating means for clutching shift in advance of actual clutching of the sleeve so that loss of the pressure fluid after such loading will not affect the subsequent desired clutching of the sleeve. Such features are particularly advantageous in connection with the use of intake manifold vacuum to operate the piston because the presence of a vacuum depends of course on the throttle valve opening and accelerator pedal position. The term "vacuum" is used herein in a broad sense as denoting sub-atmospheric pressure and not, of course, in the strict sense of the term.

The latching mechanism comprises a latch member 236 pivoted at 237 in chamber 216 and yieldingly urged downwardly by a "rat-trap" spring 238 so that, provided the solenoid K is deenergized, the lower end of the latch will engage the forward end of a latch groove 239 in rod 205 when the piston 204 is urged forward on its pressure fluid power stroke thereby holding the piston in the Fig. 29 position independently of the continued presence of vacuum in chamber 209.

The latch member 236 has a pair of inturned lugs 240 (Fig. 30) which, in the Fig. 29 conditions of parts, overlay a shoulder 241 at the lower end of armature 218, there being a clearance between the shoulder and the lugs so that latch 236 may seat independently of the seating of armature valve part 220 and so that when the solenoid is energized to vent motor J, the armature 218 will have a certain amount of free upward movement for a "hammer-blow" contact with lugs 240 so as to insure release of latch 236 from groove 239.

As a means of manually engaging sleeve F with teeth 110, especially if the usual car battery will not start the engine and it is desired to effect starting the dead engine by towing the car, we have provided a dash controlled device operable by the vehicle driver and best shown in Figs. 1, 8 and 28. The usual dash 242 carries a knob 243 connected through a Bowden wire mechanism 244 with the abutment 207 so that when the driver pulls the knob the piston 204 will move the same as though pressure fluid was causing its power stroke to engage sleeve F, certain additional functions taking place as will later be referred to.

Inasmuch as the solenoid K will ordinarily be energized at this time, under action of the governor switch to be presently described, such that latch 236 cannot function, it is desirable with our illustrated arrangement to render the latch operable as a function of actuating knob 243 so that the piston 204 will stay in the Fig. 29 position after the manual operation. To this end we have provided a dash switch M which comprises electrical terminals 245, 246 normally bridged to close this switch by the spring contact piece 247 held in position by a suitable dog 248 fixed to the Bowden wire 244. When the knob 243 is in its inoperative Fig. 1 position the contact piece 247 of switch M completes a circuit (to be described later) between terminals 245, 246 but when the knob is pulled out the dog 248 moves to the position 248' and contact piece 247 springs downward to the position 247' to open switch M which will then maintain solenoid K deenergized so that latch 236 may operate.

Whenever the car is being driven, the countershaft 97 is drivingly connected with the driven shaft 93 and this relationship is conveniently utilized for controlling the automatic operation of sleeve F as a function of car speed in the following manner. It is desired to note in passing that the governor control about to be described may, if desired, be omitted although it is included by preference in order to improve the functional operating characteristics of the transmission D.

Referring to Figs. 9, 10, 12 and 27 the countershaft pump drive gear 249, which drives the lubricant pump (not shown) through a gear 250, also drives a gear 251 having a shaft portion 252 which operates a governor controlled or speed responsive switch N of any suitable type. The shaft 252 has a head 253 which carries a pair of weights 254 mounted by pivot pins 255. The weights are constrained to swing in unison by reason of an equalizer connection 256 and each weight has a stop pin 257 operable in a slot 258 in head 253. The weights are yieldingly urged inwardly (Fig. 9) by a flat leaf spring 259 which is bowed between stops 260 carried by the weights and after the shaft 252, during car acceleration, is rotating at a predetermined desired speed, the weights swing out thereby further bowing and tensioning the springs 259 and opening the switch by forcing the contact piece 261 (Fig. 31) to spring upwardly away from the stationary contact 262 which is grounded at 263. One feature of our invention resides in effecting a differential in the operation of the governor switch N as the car is accelerated or brough to a stop, it being arranged to cause the switch N to close at a much lower car speed than that required to open the switch although such relationships may be varied as desired. However, for reasons presently apparent, we prefer to hold the switch N open, during normal stopping of the car in traffic, until the car in its direct speed ratio has come down to just less than the idling speed of the engine in order to insure automatic release of sleeve F preparatory for get-away in a reduction drive. While any suitable type of governor may be employed to provide the desired functions, it is often desirable to provide for a change in the governor functions. Not only may various springs 259 be substituted for each other, but a detent control may be provided so that where there is a wide difference in cut-out and cut-in speeds for the switch, the desired functions may be obtained with accommodations for variable control.

In Fig. 10 the governor weights may each carry a ball detent 264 loaded adjustably by a spring 265 such that as the weights swing out, the balls 264 will enter notches 266 in the base 253 and serve to prevent return of the weights and closing of switch N until the desired speed of the car has been reached on bringing the car to rest. The provision of the ball detents 264 provide a convenient means of adjusting or changing the speed responsive operation of the governor by varying the position of the spring tensioning screws 267.

Referring to the diagram in Fig. 31, the circuit from contact piece 261 is taken through conductor 268 to a conductor 269 which leads to the kickdown switch 77 and thence to a ground at 270. The conductor 269 also leads to the dash switch M and thence by a lead 271 to the branch conductors 272 and 273. Conductor 272 leads to the ignition interrupting switch L thence by a conductor 273 to the switch piece 274 of a clutch pedal switch O, the purpose of which will be presently set forth. This switch has its other contact piece 275 connected so as to disable the engine ignition system, as by a conductor 276 to the distributor 277 thence by conductor 278 to coil 279, leads 280 and 281 thence through the ignition switch 282 and lead 283 to ammeter 284, from the ammeter lead 285 runs to the starter terminal 285 and thence by conductor 286 through storage battery 287 to the ground at 288.

When the clutch pedal 84 is fully released the contacts 274 and 275 are bridged to close switch O, a spring 289 then holding the movable conductor element 290 across terminals 274, 275. This conductor 290 is connected by linkage 291 with pedal 84 so that switch O is opened when pedal 84 is depressed and maintained opened throughout the operating stroke of this pedal.

The aforesaid conductor 273 leads to the armature actuating winding 292 of solenoid K, thence to the aforesaid conductor 281.

From the foregoing diagram it will be apparent that several circuits are formed.

The main kickdown circuit which is established by kickdown switch 77 for energizing solenoid K to release latch 236 and start the cycle of ignition interruption and release of clutch sleeve F, comprises ground 270, switch 77, lead 269 and dash switch M thence through leads 271, 273 to solenoid K, lead 281 through ignition switch 282, lead 283, ammeter 284 and leads 285, 286 to the battery 287 and the ground 288.

The kickdown ignition circuit which interrupts the engine ignition when the kickdown switch 77 is closed, comprises ground 270 to conductor 271 as in the main kickdown circuit, thence through lead 272 and ignition interrupting switch L, lead 273 through switch O and lead 276 to distributor 277, lead 278 to coil 279, leads 280, 281 to ignition switch 282 and thence as in the main kickdown circuit to ground 288. In connection with the ignition interrupting switch L it should be noted that when the kickdown switch 77 is closed to establish the main kickdown circuit, the latch 236 is disengaged from notch 239 (when parts are positioned as in Fig. 29) by reason of solenoid K being energized whereupon spring 222 moves piston 204 and rod 205 to take up the clearance 227 thereby closing switch L while sleeve F remains clutched. Therefore the kickdown ignition circuit under control of switch L is automatically established in response to the driver closing the kickdown switch 77 to first establish the main kickdown circuit.

The main governor circuit which energizes solenoid K at relatively low car speeds, comprises ground 263, governor switch N, leads 268, 269 to the dash switch M and thence to lead 271. From lead 271 the governor circuit continues just like the main kickdown circuit between solenoid K and ground 288.

The governor ignition circuit extends from ground 263 through governor switch N and thence to lead 271 just as for the main governor circuit. From lead 271 this circuit comprises lead 272 to the ignition interrupting switch L and thence continues to ground 288 just like the kickdown ignition circuit.

The operation of the power transmission is as follows:

With the car parked, the transmission D will of course be in neutral, with the manually shiftable sleeve H and the automatically shiftable sleeve F positioned as in Fig. 12. The ignition is off at switch 282 and the solenoid K is deenergized, and the piston 204 is in the Fig. 28 position, the spring 222 being free to maintain the sleeve F in its disengaged position.

The engine is normally started with the transmission in neutral. As soon as the ignition switch 282 is closed, preparatory to starting the engine, the solenoid K will be energized and will move armature 218 upwardly to the Fig. 28 position holding latch 236 free of the rod 205 and venting the chamber 209. It may also be noted that at this time the governor switch N is closed as in Fig. 31 thereby establishing the main governor circuit by reason of which the solenoid K is maintained energized as aforesaid. The coupling sleeve F remains in its rearward released Fig. 12 position.

To start in the lowest or slowest driving speed ratio, ordinarily called first, the driver depresses clutch pedal 84 to release the clutch C and then shifts the selector lever 165 forwardly to the low range thereby causing the manual sleeve H to shift rearwardly for blocker synchronizing clutching with the teeth 115 of the low speed gear 114. This shift is facilitated by release of clutch C thereby disconnecting the pinion 90 from the engine A and coupling B.

Depressing the clutch pedal 84 opens the switch O but as the piston rod 205 does not move to close switch L, the switch O has no function at this time.

The driver then releases the pedal 84 to engage the clutch C while depressing the accelerator pedal 59 to start the car in first. The drive in first is obtained as follows: pinion 90 drives gear 96 which causes engagement of overrunning clutch G to drive countershaft 97, gear 107 driving gear 114 whence the drive passes through sleeve H and hub 120 to the output shaft 93.

In the event that the driver holds the accelerator pedal depressed so that the car is accelerated in first to a sufficient speed to cause the governor switch N to open, the solenoid K will be deenergized ready to latch the piston rod 205 at the end of its pressure fluid stroke but while the accelerator is depressed the manifold pressure will ordinarily not be sufficient to operate the piston 204. If, however, the engine continues to drive the car in first above the speed at which the governor switch N opens, and the accelerator is at least partially released sufficiently to cause pressure fluid operation of piston 204, then the piston moves from its Fig. 28 position to the Fig. 29 position and is held at the end of its power stroke by latch 236. However, although the piston 204 compresses spring 223 thereby urging clutching shift of sleeve F, the rod 202 moves forwardly only slightly in shifting sleeve F from its Fig. 20 position to its Fig. 21 drive blocking position. Actual clutching of sleeve F will then take place when the teeth 110 are allowed to slow down to synchronize with the speed of rotation of gear 109 and sleeve F.

In order to facilitate a discussion of the control functions, we will assume that the governor switch N is so arranged in relation to the particular car and transmission illustrated, that this switch will open when the car is driven in first at about 7 m.p.h. (miles per hour). Obviously this may be varied as desired but, as a result of experience, it is believed to be an approximately desired condition. The governor switch N is preferably arranged to close, when its drive shaft 252 slows down from above the aforesaid critical speed of opening, at a corresponding car speed below the assumed 7 m.p.h when in the second speed and, if desired, any well known form of detent means, such as that shown in Fig. 10 for example, may be employed to control the operating functions of the governor. As an example of one power transmission we have arranged the gearing and governor operation such that the governor switch will open during car acceleration in first and third respectively at 7 and 15 m.p.h., the switch closing on stopping the car in direct and second respectively at 7 and 3 m.p.h. In such instance we used an axle ratio of 3.54 to 1 and a transmission ratio in first, second, third, fourth and reverse of 3.06 to 1, 1.97 to 1, 1.55 to 1, 1 to 1, and 3.26 to 1, respectively.

This drive in first is a free-wheeling drive below 7 m.p.h. car speed because within such limits the governor switch N remains closed and solenoid K is thereby energized to maintain motor J vented, the driven shaft 93 being free to overrun the driving shaft 83 by automatic release of the overrunning clutch G.

When the car is driven above 7 m.p.h. in first, this being the normal operation of the car and being one reason for setting the critical speed of the governor switch N at the assumed relatively low car speed, the governor switch opens thereby deenergizing the solenoid and upon release of the accelerator pedal to lower the pressure in manifold 54 and chamber 209 then sleeve F will shift to clutch with teeth 110 when these teeth are allowed to coast down to synchronize with the speed of sleeve F as aforesaid to step-up the drive from first to second.

While the car is being driven under the foregoing conditions above 7 m.p.h. in first, the shift from first to second is automatic and operates in response to driver release of the accelerator pedal 59 sufficiently to slow down the engine speed to the point where the blocker 185 will release the sleeve F. This is most conveniently accomplished by simply letting up on the accelerator pedal whereupon the speed of the engine quickly drops while the car maintains its speed by reason of overrun at clutch G. As the pinion 90 drops to the speed of gear 109, the sleeve F while urged forwardly by spring 223 begins to rotate ahead of the speed of the blocker 185 which is rotating at the speed of gear 90, and the sides of teeth 180, 180' then strike against the blocker teeth 192 (Fig. 22) to align the blocker teeth with the spaces between teeth 180, 181' and 180', 181 whereupon the sleeve will shift forwardly without shock or jar to clutch with the teeth 110 during coast (Fig. 23) and thereby clutch the driving shaft 83 with gear 109 for the second speed drive faster than the aforesaid drive in first. The pilot lands 179 (Fig. 18) center and guide the sleeve F against binding on the teeth 178 during forward shift of the sleeve in order to facilitate the clutching of the sleeve with teeth 110 during coast. However, in the event that the sleeve only partially completes its clutching engagement with teeth 110 during coast, then in such event the sleeve F will fully shift forwardly to the Fig. 23 position at the instant that the driving shaft is next speeded up. Sleeve F therefore clutches during coast and under predetermined pressure of spring 223 which cushions the clutching and greatly increases the life of the clutch teeth.

The drive in second passes from pinion 90 through sleeve F to gear 109 thence to gear 106, countershaft 97, gears 107 and 114, sleeve H, hub 120 and the driven shaft 93. This drive is a two-way drive, clutch G overrunning, and is maintained by the spring 223 which is kept compressed against the releasing action of spring 222 by the latch 236, the solenoid K being deenergized as in Fig. 29. The engine is used as a brake during coast in the second speed ratio, the car driving the engine at approximately twice the speed of the driven shaft 93 for the particular gear sizes illustrated.

Coasting in second speed below approximately 3 m.p.h. (or below approximately 7 m.p.h. in direct) will cause the sleeve F to automatically shift back to its Fig. 20 disengaged position. In order to accomplish this it is desirable to provide some means for momentarily reversing the direction of the torque at the teeth 110 and the teeth of sleeve F so that the sleeve will be unloaded and its release, on stopping the car assured. This arrangement provides automatic step-down in the transmission in response to stopping the car so that the driver on subsequently depressing the accelerator for accelerating the car will have the benefit of a favorable torque multiplication in the transmission by automatically shifting back to either third or first depending on the setting of the shift lever 165. In order to bring this about, the governor switch is purposely arranged so that on stopping the car in either direct or second, the switch N will not close until the engine is operating at a speed preferably just below its idling speed.

Thus, on coasting down to a stop, the governor switch N closes at a time when the engine is trying to turn up to its idling speed. When switch N closes, the parts being in the Fig. 29 position, the main governor circuit comes into action to energize solenoid K thereby releasing latch 236 whereupon spring 222 moves rod 205 to take up clearance 227 and close the ignition control switch L. This brings the governor ignition circuit into action to interrupt the ignition whereupon the engine for an instant slows down thereby reversing the direction of the torque at the teeth 110 and the teeth of sleeve F and at this instant spring 222 acts to disengage sleeve F. When piston 204 reaches its Fig. 28 position, switch L opens thereby restoring the ignition and the engine immediately comes up to its idling speed. This whole cycle occurs so quickly that the engine does not stall and the driver is not conscious of the engine ignition being instantaneously interrupted. Of course, if the car coast in second does not go below 3 m.p.h. then the governor switch N remains open and acceleration of the car will then take place in second without shifting back to first. Likewise unless the coasting in direct goes below 7 m.p.h. the car may be accelerated in direct without automatically dropping back to third or first.

In shifting from the low range to the high range, the third speed will be brought into operation if the shift is made below 15 m.p.h. because the governor switch N will then maintain motor J vented and sleeve F released. However, if this shift is made above 15 m.p.h. then direct will be effected because the governor switch N will be open and latch 236 will operate to hold rod 205 in the Fig. 29 position.

Assuming that the shaft from low range to high range is made when the car is travelling below 15 m.p.h. in second, the driver depresses clutch pedal 84 to release the main clutch C and he then moves the selector lever rearwardly to the high range position to thereby cause the manual shift sleeve H to move forwardly under blocker synchronizing shift to clutch with teeth 112 of gear 109 whereby this gear is directly drivingly connected with driven shaft 93 through sleeve H and hub 120. The driver then releases the clutch pedal 84 and depresses the accelerator pedal to drive the car in the third speed ratio. The sleeve F will be released in this instance because the governor switch maintains the solenoid energized. The drive in third takes place from the main pinion 90 to gear 96 thence through the overrunning clutch G and through gears 106, 109 and directly out to the driven shaft 93.

If, on the other hand, the car is travelling above 15 m.p.h. in second then the governor switch N remains open and the solenoid is deenergized to maintain the parts in the Fig. 29 position holding sleeve F clutched. In shifting to the high range under these conditions, the driver depresses the clutch pedal 84 and then releases the main clutch C. The driver then shifts the selector lever 165 rearwardly to the high range, as before, to clutch sleeve H with gear 109 and under these conditions the shift will be made to direct, skipping third.

The illustrated gears are of such sizes so that in accelerating the car in the third speed, the critical speed of the governor switch is roughly 15 m.p.h. car speed instead of 7 m.p.h. as in the first and second. It is also noted that the governor drives at the same speed proportional to the driven shaft 93 in first and second; also at the same speed proportional to the driven shaft speed in third and direct. Therefore the drive in the third speed below 15 m.p.h. is accompanied by free wheeling accommodated by the overrunning clutch G. Under these conditions the governor switch N remains closed to energize the solenoid K and the sleeve F remains disengaged.

When driving in the third speed above 15 m.p.h. the governor switch N is open to deenergize the solenoid and direct drive will automatically be obtained when the accelerator pedal is released for accommodating synchronous clutching of sleeve F. At the same time vacuum will be supplied to motor J to latch rod 205 in its Fig. 29 position, or the rod 205 may be latched by vacuum operation prior to synchronous clutching of the sleeve F. Once the rod 205 is latched, the sleeve F will clutch under action of spring 223 independently of vacuum supply. Under such conditions there is no free wheeling in the ordinary sense, the overrunning clutch G allowing the engine and shaft 83 to drop to the speed of gear 109 whereupon clutch F will engage teeth 110 as before.

The shift from third to direct is therefore automatic and is obtained by releasing the accelerator pedal momentarily while driving the car above 15 m.p.h. At the synchronizing point, the blocker 185 will allow the sleeve F to clutch with teeth 110 under the force of spring 223 as before.

The direct drive is a two-way drive and passes from pinion 90 directly to gear 109 through sleeve F, thence directly to shaft 93 through sleeve H. If the car is allowed to coast below 7 m.p.h. in direct the governor switch N will close and establish the governor ignition circuit to energize solenoid K whereupon, as before, clearance 227 is taken up to close switch L to establish the governor ignition circuit at the time the engine is trying to come up to its idling speed. This ignition interruption will release sleeve F by torque reversal and the transmission will drop back to its third speed ratio with the parts J, K and L positioned as in Fig. 28.

If desired, the car may be started from rest in third by releasing the main clutch C and shifting the selector lever 165 rearwardly to the high range. The solenoid K remains energized by governor switch N and on releasing the clutch pedal 84 and depressing the accelerator pedal 59, the blocker 185 will lead the sleeve F (Fig. 20) preventing its shift forwardly when the car is accelerated in third above the speed at which the governor switch N opens, viz., about 15 m.p.h. even though piston 204 should be latched in its Fig. 29 position. Direct drive will then result from releasing the accelerator pedal to synchronize gear 90 with sleeve F as before.

The kickdown control functions to step down the drive from direct to third if the car speed is above 15 m.p.h. or from second to first if the car speed is above 7 m.p.h. and, of course, depending on the setting of the manual shift sleeve H.

Assuming that the car is driving in direct above the critical speed of the governor switch N, viz., above 15 m.p.h. then the driver may obtain third by depressing the accelerator pedal 59 beyond the normal throttle opening range and through the kickdown range overtravelling the wide open throttle position. The kickdown switch 77 is thereby closed to energize solenoid K by establishing the main kickdown circuit. This raises latch 236 and allows spring 222 to move the rod 205 rearwardly to take up the gap 227. This closes switch L to establish the kickdown ignition circuit thereby interrupting the ignition to unload the sleeve F which thereupon shifts rearwardly to its Fig. 19 released position and the ignition is restored, the parts being in the Fig. 28 position. The engine rapidly speeds up under open throttle condition to engage the overrunning clutch G and the car is then driven in the third speed. This whole cycle of kickdown takes place very rapidly and smoothly and is entirely responsive to the natural movement of the accelerator pedal downwardly into the kickdown range. The kickdown is conveniently used as a faster car accelerating drive for rapidly passing another car, in obtaining more favorable torque multiplication for hill climbing, etc. When the accelerator pedal is released, then the direct drive is automatically synchronously obtained. By preference, the direct drive is not restored after kickdown until the accelerator pedal is substantially fully released, as when finger 74 operates switch arm 76. This prevents undesired operations of the kickdown mechanism and changes in the speed ratio within a narrow range of accelerator pedal movement. Therefore the kickdown switch 77 when closed maintains the solenoid K energized and the solenoid is not deenergized to latch the piston 204 until the accelerator is approximately fully released, this release also serving to instantly cause the vacuum to operate piston 204 into its Fig. 29 position.

When driving the car in the second speed ratio above 7 m.p.h., the accelerator pedal may be depressed to the kickdown range to effect release of the sleeve F and a drive in first as will be readily understood from the description of the kickdown from fourth to third. Likewise the second speed is restored upon release of the accelerator pedal.

In order to drive the car in reverse, the driver releases the clutch G and shifts the selector lever from neutral upwardly and then rearwardly to mesh the reverse idler gear 117 with the gears 108 and 119. This reverse drive passes from pinion 90 to gear 96, then through overrunning clutch G and gears 108, 117, 119 to the driven shaft 93. The reverse drive is therefore a free wheeling drive and is illustrated as being of a ratio such that the governor switch N will open at about the same car speed as the drive in first, viz. 7 m.p.h. to deenergize the solenoid K and effect synchronous clutching of sleeve F with the teeth 110 in response to release of the accelerator pedal. If the driver manipulates the reverse drive in this manner then a step-up in reverse is obtained without free wheeling. Such a drive passes through the following parts: pinion 90 through sleeve F to gear 109 thence to gear 106 and through the reverse gear set 108, 117, 119 to the driven shaft 93.

It sometimes happens that the car battery is insufficiently charged to start the engine and in such instances it is desirable to be able to start the "dead" engine by towing the car. In our transmission system we have provided means for clutching the sleeve F with teeth 110 without vacuum supply to motor J, this being necessary to get the engine started. In other words, in order to drive the engine from the rear wheels 53, clutch member H is manually shifted preferably forwardly to high speed position engaging teeth 112 but unless the sleeve F is clutched to teeth 110 the overrunning clutch G will overrun and the engine will not be turned over. The driver pulls the knob 243 which operates through the Bowden wire 244 and head 207 (Fig. 28) to pull piston 204 forwardly to its Fig. 29 position thereby loading spring 223 and urging sleeve F forwardly. In order that the driver need not hold the knob 243 out during the engine starting, the dash switch M is provided and this switch opens when the knob is pulled thereby breaking the main governor circuit so that the solenoid K is deenergized and latch 236 will hold the piston 204 in the Fig. 29 position. With the ignition turned on at switch 282 and with clutch pedal 84 depressed the car is then towed or pushed. If, when the sleeve F was thrust forwardly, the sleeve engaged the blocker teeth in the Fig. 21 drive blocking condition, then as soon as the car moves to drive sleeve F forwardly, the sides of the long teeth 180, 180' will engage the blocker teeth and the sleeve will move forwardly to clutch with teeth 110. If, however, when the sleeve F was thrust forwardly the sleeve engaged the blocker teeth in the Fig. 26 coast blocking condition then as soon as the car moves to drive sleeve F forwardly, then the blocker teeth 192 move slowly ahead of the sleeve teeth so as to just drop off the ends of the long teeth 180, 180' and because of the very slight relative rotational speeds of the blocker and sleeve, the blocker teeth will not jump the gap and strike the ends of the short teeth 181, 181' (as in the case of the driver depressing the accelerator pedal to speed up the engine during normal operation of the transmission in picking up a reduction drive from the coast blocking condition as aforesaid) and the sleeve F will move forwardly to clutch with teeth 110. The reason that the blocker 185 rotates ahead of the sleeve is as follows. First of all, the main clutch C being released, there is an oil drag acting through the overrunning clutch G which, while overrunning, tends to drag the main drive pinion 90 and blocker 185 forwardly at an overdrive speed and this tendency is accentuated in cold weather when the oil is relatively more viscous than in summer and when the battery is more likely to fail. In addition to the drive through overrunning clutch G, the cam or chamfer 193 now comes into play to cam the blocker 185 forwardly ahead of the sleeve F by reason of the spring thrust on the sleeve.

With the sleeve F clutched as in Fig. 23 and the car being towed the driver now releases the clutch pedal 84 and the engine will be turned over for starting. Once the engine starts vacuum is available for supply to motor J and the system will function normally upon release of the knob 243. When this knob is released the car towing speed and the shift position of sleeve H will determine whether solenoid K is then energized. If the car speed is above 15 m.p.h. with sleeve H forwardly in high, then the switch N is open and if the sleeve H is in its rearward position then the switch N opens at 7 m.p.h. In any event by releasing knob 243 after pedal 84 is released and after the engine is started there is no danger of losing the drive while starting the engine by towing.

Furthermore, if for any reason the solenoid vacuum system should fail to operate, the knob 243 affords a means whereby the car may be driven selectively under control of lever 165 in second, direct or reverse with the knob 243 left in its pulled position because under such conditions the engine is operating and sleeve F will clutch on engine coast after starting in first or third (depending on the position of lever 165) and once the sleeve F is clutched it will stay in such condition until the knob 243 is released and in the meantime the transmission is under control of the lever 165.

There is another way of engaging sleeve F for car towing to start a dead engine whereby to ensure manual engagement of the sleeve in the drive blocking position. With the pedal 84 released the driver operates the engine starter and then pulls knob 243. There is most always enough energy in the battery to rotate the unloaded pinion 90 slightly ahead of the sleeve F (only one-thirtieth of a revolution being required) and this will place the parts as in Fig. 20 so that when knob 243 is pulled the sleeve will be in drive blocking condition of Fig. 21. Then when, as before, the pedal 84 is depressed, the car towed to gain momentum and move the sleeve ahead of the blocker 185 to clutch the sleeve, the pedal 84 is released and the engine started, the manual sleeve H being of course in one of its clutched positions. From the foregoing it will be apparent that the dead engine can be started without the provision of chamfers 193 on the blocker teeth 192 if it is desired to omit these chamfers.

If desired, the car may be accelerated from standstill by depressing the accelerator pedal to the kickdown range and then releasing the pedal to automatically provide a step-up in the drive, the step-up being delayed until substantially full release of the accelerator pedal. Thus, with the engine idling, the driver may depress the clutch pedal 84 and select either the high or low range at selector lever 165 to shift sleeve H rearwardly or forwardly. The governor switch N maintains the solenoid K energized and motor J vented. Then the clutch pedal is released and the accelerator pedal depressed to its kickdown range. Although this closes the switch 77 the engine ignition is not grounded because the switch L is held open. As the car accelerates above the critical speed of the governor switch N (7 m.p.h. in first and 15 m.p.h. in third) the governor switch opens but the solenoid remains energized as the switch 77 is closed and will stay closed until approximate full release of the accelerator pedal. On such release of the accelerator pedal above the governor critical speed, the switch 77 is opened and the solenoid is deenergized and pressure fluid acts at motor J to cause sleeve F to engage teeth 110 under synchronizing control by the blocker 185.

The no-back characteristics of our transmission may be used as a holding device for the car on a hill. If the knob 243 is pulled out the vacuum unit is divorced from control on the transmission and sleeve F will remain in its clutched position as aforesaid. This will provide only two speeds, second and direct, each being a non-free wheeling drive with a no-back condition in the transmission. Thus the car can be stopped on a hill and will not roll backward if sleeve H is in a forward shift position by reason of clutch G locking up. Also, the car will not roll forward if facing down hill with a reverse setting of the transmission.

In order to change gears in a no-back condition, where an obstruction prevents drive of the car in the direction established by the setting of sleeve H, the engine is speeded up, the foot is removed from the accelerator pedal and gearshift made during torque reversal by changing the engine drive torque to car coasting torque. The car does not need to move, as gearshifting from a no-back condition may always be made.

In general it may be noted that the governor switch N automatically directs the shift from fourth into third or from second into first whenever the car slows down below 7 m.p.h. in direct or 3 m.p.h. in second. At such times the switch N closes thereby energizing solenoid K to vent motor J and allow spring 222 to shift rod 205 to take up gap 227. This closes switch L to establish the governor ignition circuit thereby interrupting the ignition while spring 222 acts to release sleeve F during the torque reversal at the sleeve. The switch L then opens and restores the ignition. The aforesaid speeds of 7 m.p.h. in direct and 3 m.p.h. in second are just below the engine idling speed thereby insuring torque reversal and release of the sleeve when the ignition is momentarily interrupted. This insures an automatic step-down when stopping the car and likewise insures car acceleration from a stop in a favorable torque multiplying gear ratio assisted by the characteristics of the fluid coupling which allows the engine to turn at approximately its maximum torque, the car rapidly "coming up" to the speed of the engine. With such a system the shift lever 165 is preferably left in high under all ordinary driving condition, except for reversing, parking and when exceptional torque multiplication is desired. With the lever 165 left at high, the driver need only operate the accelerator pedal and the brake pedal to start and stop the car. The control on sleeve F augmented by the fluid coupling insures rapid get-away with automatic step-up while the kickdown control is always available to step-down the drive from direct to third, when there is a demand for more favorable torque transmission. Where exceptional torque multiplication is desired, the driver shifts lever 165 to low and obtains automatic functions of sleeve F and kickdown control as when lever 165 is set for high.

By preference, the governor switch N is operated from the countershaft 97 as illustrated rather than from the driven shaft 93 because, among other things, interruption of the ignition when the car comes to a stop in second gear would be at a car speed above engine idling speed and the torque would not reverse at sleeve F, assuming of course that the device was arranged to operate properly for a coasting stop in direct.

The significance of the clutch pedal switch O interposed in the ignition interrupting circuit is as follows. If the ignition is cut off at switch 282 at a time when the shift sleeve H is shifted either to its high range or to its low range and when the car is running up hill at a speed above the critical speed of governor switch N, that is at a speed when switch N is open and motor J is in the Fig. 29 position and with sleeve F clutched, the sleeve F would remain in its forward clutched engagement with teeth 110 as the car stops because solenoid K remains latched as in Fig. 29. This is brought about because the main governor circuit is open at ignition switch 282 so that when the governor switch N closes, as the car stops, the solenoid K nevertheless remains de-energized. Furthermore, as the car comes to a stop there is imposed a coast load on the teeth of sleeve F.

If the car at this time starts to coast backward, a coast load is also imposed on the teeth of sleeve F although in the opposite direction while the piston 204 stays latched as in Fig. 29. Then, if the ignition is turned on at switch 282, the solenoid K is energized to release latch 236 and piston 204 moves under the action of spring 222 to take up clearance 227 thereby interrupting the ignition at switch L. However, this would not permit disengagement of sleeve F because of the car coast load imposed on sleeve F preventing its disengagement by spring 222, and no reversal of torque occurs. This means that rod 205 does not move to reestablish the ignition system at switch L so that the engine stalls and cannot be started in the normal manner. Furthermore, there is, under these conditions, an inherent lock-up condition in the transmission D which prevents shifting the selector lever 165 out of either of its forward drive positions where it was set when the car came to a stop with the ignition turned off under the foregoing assumed conditions. If, for example, the shift lever 165 was set for high, which is the normal setting, so that sleeve H is clutched with teeth 112, then the aforesaid backward roll tendency of the car tries to impose two differing ratio drives on drive shaft 83 thereby loading sleeves H and F and preventing shift of these sleeves as well as preventing backward roll of the car. One drive tends to go from driven shaft 93 to hub 120, sleeve H to gear 109 thence to gear 106 and through overrunning clutch G to gear 96 and pinion 90 of shaft 83. The other drive tends to go from shaft 93 to hub 120, sleeve H to gear 109 thence through sleeve F to pinion 90 of shaft 83. (If sleeve H was clutched rearwardly with gear 114 then the two drives would both tend to go from shaft 93 to hub 120, thence through sleeve H to gears 114 and 107. At gear 106 the driving tendencies to pinion 90 divide, one drive going through overrunning clutch G and the other going through gear 109 and sleeve F as will be readily apparent.) The only way to start the engine is to stop grounding the distributor primary circuit (open the ignition interrupting circuit) and thus restore the ignition system and this is done by depressing the clutch pedal 84 to open switch O. When this is done the engine can be started for forward drive of the car and when the clutch pedal 84 is released there is imposed a drive load on the teeth of sleeve F, thereby reversing the load from the aforesaid coast load, and sleeve F instantly moves rearwardly to its released position by spring 222 so that motor J is in the Fig. 28 position whereupon the switch L opens and the ignition system and transmission is restored to normal operation including release of the transmission D from its locked-up condition. During this release of the clutch pedal, the main clutch C engages preferably prior to closing of switch O as aforesaid so that there is no tendency to again ground the ignition before reversing the torque direction at the teeth of sleeve F. However, the flywheel of the engine would, in any event, continue to keep the engine going sufficiently to deliver a driving impulse to sleeve F before stalling as the clutch pedal is released so that even if the relationship of operation of clutch C and switch O was such that there was a tendency to ground the ignition as the clutch C was engaged, the momentary forward drive at sleeve F accompanied by almost instantaneous rearward shift of the sleeve and restoration of the ignition would ordinarily prevent complete stalling of the engine. Obviously, the switch O may be operated by means other than the clutch pedal. Furthermore, the peculiar condition outlined is so unusual that, if desired, the switch O may be omitted.

Referring now to Figs. 32 and 33 we have illustrated a slightly modified arrangement of fluid coupling B' which may be substituted for coupling B in the foregoing power transmission system. The coupling B' is identical to coupling B except that now an overrunning clutch P' is introduced to operate between the coupling impeller 79 and runner 80. The runner hub 300 has cams 301 adapted to wedge rollers 302 with the cylindrical part of crankshaft 78'.

The overrunning device P' is of the so-called reverse type in that it runs free for forward rotation of the crankshaft faster than the runner hub 300 but prevents the crankshaft from turning slower than hub 300. Thus the coupling B' functions normally in transmitting slip drive from the impeller 79 to runner 80. The main purpose of the arrangement is to expedite clutching of sleeve F because when the transmission is operating in a reduction drive and the accelerator pedal is released to synchronize gear 90 with sleeve F for the automatic step-up, instead of the engine dropping in speed ahead of runner 80 and gear 90, the overrunning clutch P' operates to lock these parts with the crankshaft so that the gear 90 is more rapidly slowed down to the speed of sleeve F. Hence the time interval is materially shortened in connection with the clutching of sleeve F. Otherwise, the transmission equipped with the overrunning clutch P' operates as in the main embodiment Figs. 1–31.

We have also shown in Figs. 34 and 35 a further modification of our invention wherein the manual engagement of clutch sleeve F is facilitated especially as the driver does not, as before, have to pull against the sleeve engaging spring. In the modified arrangement the sleeve engaging spring is still arranged to engage the sleeve F but now the vacuum motor when operated by the pressure fluid does not thrust through the sleeve-applying spring but rather unblocks the spring so as to allow the spring to operate. In either case there is provided, however, a lost motion operating connection between the piston of the vacuum motor and the sleeve F.

Referring to Figs. 34 and 35 the system illustrated therein is much the same as in Figs. 1–31 and is intended to be substituted for corresponding parts therein. As a matter of fact the Fig. 34 system for the most part duplicates the Fig. 31 system and the functional results, insofar as the operator is aware in driving the car, are substantially identical apart from the manipulation of the manual device for the sleeve F. The Fig. 32 arrangement is likewise just as applicable for use to advantage with the Fig. 34 system as with the main embodiment in Fig. 31.

In Fig. 34 the parts are shown operating under the conditions for Fig. 31, the kickdown switch 77 being open and the governor switch N being closed to energize solenoid K so that motor J is vented and piston 204 is operated rearwardly by spring 222 to disengage the sleeve F. This is the condition for driving the car in one of the reduction drives through the over-running clutch G at a relatively slow car speed viz., below the speed at which governor switch N opens to deenergize solenoid K.

In Fig. 34 the piston 204 is secured to its piston rod 205' which has its front end shorter than before so that, with the parts as shown, the ball 232 of the ignition switch L fits the recessed end portion of rod 205' at groove 233' so as to allow switch L to open as before. The rod 205' is formed with grooves 235 and 239 which are identical in function to the corresponding parts 233 and 239 previously described.

Rod 205' may now be solid as it does not house a spring as was the case of rod 205. The rod 205' now extends rearwardly from piston 204 by reason of a thrust projection rod portion 206' within the flexible dust guard or boot 209'. In Fig. 34 the spring 222 is thrusting the rear end of rod portion 206' against the front end of link 202' which is pivotally connected at 201' to the lower end of the aforesaid lever 200 such that sleeve F is thrust rearwardly into its disengaged position.

Link 202' slides at its forward end portion through the rear end of the flexible boot 209' and is capable of swinging about pivot 201' upwardly in the slot 304 of a fixed support guide 305. A rat-trap spring 306 acts between lever 200 and link 202' to yieldingly urge the link downwardly to the bottom of slot 304 at which time it is in alignment with rod portion 206'. The power means for moving sleeve F forwardly for clutching with teeth 110 comprises a spring 223' operating between a stationary part 307 and lever 200, this spring having less power than spring 222 so that the latter may disengage sleeve F against the force of the spring 223' as in Fig. 34.

The dash knob 243' now operates through Bowden wire 244' to swing a pivotally supported bell crank 308 from the solid line position to the dot and dash position thereby lifting the front end of the link 202' out of engagement with rod portion 206'. This allows spring 223' to yieldingly urge sleeve F forwardly to clutch with teeth 110 under the same conditions as for the main embodiment to start a dead engine or to manually engage sleeve F in the event of failure of the pressure fluid system. When sleeve F clutches, the link 202' takes the dot and dash position as in Fig. 34.

If desired, the knob 243' may be left in the pulled position so as to maintain sleeve F clutched thereby divorcing the vacuum system from the sleeve F just as in the Fig. 31 system. At such time as it is desired to restore the system to the operative control by the motor J, the operator pushes the knob 243' inwardly and when the piston 204 is at the end of its forward stroke then spring 306 acts to restore the link 202' to the bottom of slot 304 in alignment with the rod portion 206'. It should be noted that in the Fig. 34 arrangement it is not necessary to employ the dash switch M of Fig. 31. Furthermore the driver is now required to exert very little effort to pull out the knob 243' as this is not now opposed by the operating springs as in Fig. 31.

In Fig. 35 the parts are shown in a typical condition of drive when sleeve F is clutched with gear 90. The governor switch N is open to deenergize solenoid K and vacuum has operated to move piston 204 forwardly to the end of its stroke such that latch 236 engages groove 239, as before, to hold the piston. At this time the forward movement of sleeve F and link 202' are limited by the stop pin 226, the rod 205' overtravelling the link in this direction by the amount of the gap or clearance 227 which functions exactly as in Fig. 31 so that, upon energization of solenoid K by either the kickdown switch 77 or governor switch N, the latch 236 will release rod 205' which then moves rearwardly under the action of spring 222 for the amount of clearance 227 thereby closing switch L so that the ignition is interrupted to unload sleeve F. When this takes place, spring 222 acts through rod 205' and link 202' to release sleeve F whereupon the ignition is restored and the parts are positioned as in Fig. 34 ready for spring 223' to clutch sleeve F when link 202' is permitted to move forwardly by the piston 204 acting to move rod portion 206' forwardly thereby unblocking link 202'. Rod 205' comprises a leader part and link 202' a follower part during this part of the operation although link 202' cannot move all the way forwardly until sleeve F is synchronous with gear 90 just as in the main embodiment. The net result is the same as for Fig. 31, there being in each instance some form of a lost motion in the connection between piston 204 and sleeve F such that the piston may operate by vacuum in advance of the sleeve F clutching with teeth 110.

The general operation of the Fig. 34 device is the same as in the main embodiment and will therefore not be repeated.

We claim:

1. In a power transmission for driving a vehicle having an engine of the type equipped with an ignition system; a rotatable driving structure adapted to receive drive from the engine; clutch means between the engine and said driving structure; driver operated means for controlling operation of said clutch means; a first switch operated incident to operation of said driver operated means; a rotatable driven structure adapted to transmit drive from the driving structure for driving the vehicle; a drive-controlling clutch member drivingly connected with one of said structures and shiftable to positively clutch with the other of said structures to establish a driving relationship between the structures; a motor controlling shift of said clutch member; a second switch operated incident to operation of said motor; and electrical circuit-forming means controlled by said switches for controlling operation of the engine ignition system, said switches being arranged in series with each other in said circuit-forming means.

2. In a power transmission for driving a vehicle having an engine of the type equipped with an ignition system; a rotatable driving structure adapted to receive drive from the engine; a clutch between the engine and said driving structure; a pedal for releasing said clutch; a switch operated by said pedal; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a pressure fluid operated motor for controlling shift of said clutch member; a second switch operated by said motor; and electrical circuit-forming means controlled by said switches for controlling the engine ignition system, said circuit forming means including said switches arranged therein in series with each other.

3. In a power transmission for driving a vehicle having an engine; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a differential fluid pressure operated motor for controlling shift of said clutch member; valving means for controlling application of differential fluid pressure to said motor; electromagnet means operably associated with said valving means and adapted to control operation of the valving means so as to effect venting of and application of differential fluid pressure to said motor; means urging release of said clutching member from its clutching position when said motor is vented; a plurality of electromagnet control means operable independently of one another, at least one of said electromagnet control means being operable by the vehicle driver; means operating in response to operation of each of said control devices for controlling energization of said electromagnet; and means operable at the will of the driver to effect shift of said clutch member to establish said driving relationship independently of differential fluid pressure operation of said motor.

4. In a power transmission for driving a vehicle having an engine provided with an ignition system and a throttle valve; an accelerator pedal operable by the vehicle driver through a primary range of movement in adjusting the throttle valve from closed to open positions thereof; means providing a yielding abutment for said accelerator pedal when said accelerator pedal is moved to the limit of said primary range in throttle-opening direction, said yielding abutment accommodating driver operation of said accelerator pedal beyond said limit for a secondary range of movement overtravelling the primary range; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; clutch means drivingly connecting the engine with said driving structure; a clutch pedal operably connected with said clutch means and adapted when actuated to cause the clutch means to release the driving structure from driving connection with the engine; an output shaft; driver operable means for establishing driving connection between the driven structure and the output shaft; a differential fluid pressure operated motor for controlling shift of said clutch member; valving means for controlling application of differential fluid pressure to said motor; an electromagnet operably associated with said valving means and adapted to control operation of the valving means so as to effect venting of and application of differential fluid pressure to said motor; means urging release of said clutching member from its clutching position when said motor is vented; means operating in response to driver actuation of said accelerator pedal for said secondary overtravelling range for controlling energization of said electromagnet and for rendering the engine ignition system inoperative; and means operating in response to driver actuation of said clutch pedal for restoring the engine ignition system to normal operation.

5. In a power transmission for driving a vehicle having an engine; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a differential fluid pressure operated motor for controlling shift of said clutch member; valving means for controlling application of differential fluid pressure to said motor; electromagnet means operably associated with said valving means and adapted to control operation of the valving means so as to control venting of and application of differential fluid pressure to said motor; means urging release of said clutching member from its clutching position when said motor is vented; means for controlling energization of said electromagnet in response to rotation of one of said structures below a predetermined speed; means operable by the vehicle driver for effecting energization of said electromagnet when the last said structure is rotating above said predetermined speed; and means controlled by the vehicle driver for effecting clutching shift of said clutch member independently of differential fluid pressure operation of said motor.

6. In a motor vehicle power transmission having an engine provided with an ignition system; a driving structure adapted to receive drive from the engine; a driven structure adapted to receive drive from the driving structure for driving the vehicle; clutch means drivingly connecting the engine with the driving structure; a driver operable clutch pedal for effecting engagement and release of said clutch means; means operable to establish a speed ratio driving relationship between the driving and driven structures and including positively engageable drive control elements one of which is releasably movable relatively to the other to release said speed ratio drive when the engine ignition system is momentarily disabled; electrical circuit-forming means for disabling the ignition system; a driver operable drive controlling member; means operable in response to driver operation of said control member for simultaneously effecting establishment of said electrical circuit-forming means and releasing movement of said one drive control element; and means interposed in said electrical circuit-forming means for disabling said electrical circuit-forming means in response to operation of said clutch pedal.

7. In a motor vehicle power transmission having an engine provided with an ignition system; a driving structure adapted to receive drive from the engine; a driven structure adapted to receive drive from the driving structure for driving the vehicle; means operable to establish a speed ratio driving relationship between the driving and driven structures and including positively engageable drive control elements one of which is releasably movable relatively to the other to release said speed ratio drive when the engine ignition system is momentarily disabled; electrical circuit-forming means for disabling the ignition system; a driver operable drive controlling member; means operable in response to driver operation of said control member for simultaneously effecting establishment of said electrical circuit-forming means and releasing movement of said one drive control element; and means interposed in said electrical circuit-forming means and operable under control of the vehicle driver for disabling said electrical circuit-forming means.

8. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; and manually controlled means operable by the vehicle driver for causing said yielding means to urge said drive-establishing movement of said movable drive control element independently of said pressure fluid operation of said piston.

9. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; releasable holding means adapted to releasably hold said piston in its said second position and adapted, when released, to accommodate movement of said piston to its said first position; and manually controlled means operable by the vehicle driver for moving said piston to its said first position independently of said pressure fluid operation of said piston thereby causing said yielding means to urge said drive-establishing movement of said movable control element.

10. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; valving means operable to control said pressure fluid operation of said piston; vehicle speed responsive means for controlling operation of said valving means; and manually controlled means operable by the vehicle driver for causing said yielding means to urge said drive-establishing movement of said movable drive control element independently of said pressure fluid operation of said piston.

11. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; valving means operable to control said pressure fluid operation of said piston; means operable at the will of the driver for controlling operation of said valving means; and manually controlled means operable by the vehicle driver for causing said yielding means to urge said drive-establishing movement of said movable drive control element independently of said pressure fluid operation of said piston.

12. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; valving means operable to control said pressure fluid operation of said piston; vehicle speed responsive means for controlling operation of said valving means; means operable at the will of the driver for controlling operation of said valving means independently of said control thereof by said speed responsive means; and manually controlled means operable by the vehicle driver for causing said yielding means to urge said drive-establishing movement of said movable drive control element independently of said pressure fluid operation of said piston.

13. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movements of said movable drive control element, said motor comprising a piston operable by pressure fluid from a first position to a second position thereof; a spring yieldingly urging said piston to its said first position; piston operated means for transmitting movement from said piston to said movable drive control element and adapted for movement for imparting said drive-releasing movement to said movable drive control element; yielding means operating to urge said drive-establishing movement of said movable drive control element when said piston is operated by pressure fluid as aforesaid and so constructed and arranged as to accommodate said pressure fluid operation of said piston in advance of said drive-establishing movement of said movable drive control element; valving means operable to control said pressure fluid operation of said piston; vehicle speed responsive means for controlling operation of said valving means such that fluid under differential pressure is applied to said piston upon the attainment of a predetermined vehicle speed as the vehicle is accelerated from rest; and manually controlled means operable by the vehicle driver for simultaneously rendering said speed responsive means inoperative and for causing said yielding means to urge said drive-establishing movement of said movable drive control element independently of said pressure fluid operation of said piston.

14. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; and manually controlled means operable by the vehicle driver for causing said yielding means to urge said drive-establishing movement of said movable drive control element with said chamber vented.

15. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; releasable holding means adapted to releasably hold said piston in its said second position and adapted, when released, to accommodate movement of said piston to its said first position; and manually controlled means operable by the vehicle driver for moving said piston to its said second position independently of said vacuum operation of said piston thereby causing said yielding means to urge said drive-establishing movement of said movable drive control element.

16. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; electro-magnetic means for controlling operation of said valving means; and manually controlled means operable by the vehicle driver for causing said yielding means to urge said drive-establishing movement of said movable drive control element with said chamber vented.

17. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; releasable holding means adapted to releasably hold said piston in its said second position and adapted, when released, to accommodate movement of said piston to its said first position; electro-magnetic means for controlling operation of said valving means and said holding means; and manually controlled means operable by the vehicle driver for causing said yielding means to urge said drive-establishing movement of said movable drive control element with said chamber vented.

18. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; releasable holding means adapted to releasably hold said piston in its said second position and adapted, when released, to accommodate movement of said piston to its said first position; electromagnetic means for controlling operation of said valving means and said holding means; vehicle speed responsive means for controlling said electro-magnetic means; and manually controlled means operable by the vehicle driver for causing said yielding means to urge said drive-establishing movement of said movable drive control element with said chamber vented.

19. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; releasable holding means adapted to releasably hold said piston in its said second position and adadpted, when released, to accommodate movement of said piston to its said first position; electro-magnetic means for controlling operation of said valving means and said holding means; vehicle speed responsive means for controlling said electro-magnetic means; means operable at the will of the driver for controlling said electro-magnetic means; and manually controlled means operable by the vehicle driver for causing said yielding means to urge said drive-establishing movement of said movable drive control element with said chamber vented.

20. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movements of said movable drive control element, said motor comprising a pressure chamber and a piston operable therein by vacuum from a first position to a second position thereof; a spring acting to move said piston to its said first position when said chamber is vented; piston operated means for transmitting movement from said piston to said movable drive control element and adapted for movement for imparting said drive-releasing movement to said movable drive control element; yielding means operating to urge said drive-establishing movement of said movable drive control element when said piston is operated by vacuum as aforesaid and so constructed and arranged as to accommodate said vacuum operation of said piston in advance of said drive-establishing movement of said movable drive control element; valving means for controlling vacuum application to and venting of said chamber; releasable holding means adapted to releasably hold said piston in its said second position and adapted, when released, to accommodate movement of said piston to its said first position; electro-magnetic means for controlling operation of said valving means and said holding means; vehicle speed responsive means for controlling said electro-magnetic means such that vacuum is applied to said piston upon the attainment of a predetermined speed as the vehicle is accelerated from rest; and manually controlled means operable by the vehicle driver for simultaneously rendering said speed responsive means inoperative and for causing said yielding means to urge said drive-establishing movement of said movable drive control element independently of vacuum operation of said piston.

21. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means adapted for operation to cause diminution of said torque transmission; and vehicle speed responsive means for controlling operation of said drive control means and said torque diminishing means such that on bringing the vehicle to rest, with said structures drivingly connected in said speed ratio drive relationship, said drive control means will operate to urge drive-releasing movement of said movable drive control element and operation of said torque diminishing means when said engine is operating at a speed which is not greater than its normal idling speed.

22. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; and means operating incident to bringing the car to rest, with said structures drivingly connected in said speed ratio drive relationship, to automatically effect said torque diminution when the engine is operating at a speed which is not greater than its normal idling speed thereby to accommodate drive-releasing movement of said movable drive control element by operation of said drive control means.

23. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operable to interrupt power delivery of said engine; and vehicle speed responsive means for controlling operation of said drive control means and said interrupting means such that on bringing the vehicle to rest, with said structures drivingly connected in said speed ratio drive relationship, said drive control means will operate to urge drive-releasing movement of said movable drive control element accompanied by operation of said interrupting means when said engine is operating at a speed which is not greater than its normal idling speed thereby to effect said torque diminution.

24. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; and means operating incident to bringing the car to rest, with said structures drivingly connected in said speed ratio drive relationship, to automatically interrupt power delivery of the engine when the engine is operating at a speed which is not greater than its normal idling speed so as to effect said torque diminution and accommodate drive-releasing movement of said movable drive control element by operation of said drive control means.

25. In a motor vehicle power transmission having an engine provided with an ignition system; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operable to disable said ignition system; and vehicle speed responsive means for controlling operation of said drive control means and said ignition disabling means such that on bringing the vehicle to rest, with said structures drivingly connected in said speed ratio drive relationship, said drive control means will operate to urge drive-releasing movement of said movable drive control element accompanied by operation of said ignition disabling means when said engine is operating at a speed which is not greater than its normal idling speed thereby to effect said torque diminution.

26. In a motor vehicle power transmission having an engine provided with an ignition system; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; and means operating incident to bringing the car to rest, with said structures drivingly connected in said speed ratio drive relationship, to automatically disable said ignition system when the engine is operating at a speed which is not greater than its normal idling speed thereby to effect said torque diminution and accommodate drive-releasing movement of said movable drive control element by operation of said drive control means.

27. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; electrically energizable means for controlling operation of said drive control means; means operable to cause said torque diminution; and vehicle speed responsive means for controlling energization of said electrically energizable means and operation of said torque diminishing means such that on bringing the vehicle to rest, with said structures drivingly connected in said speed ratio drive relationship, said drive control means will operate to urge drive-releasing movement of said movable drive control element and operation of said torque diminishing means when said engine is operating at a speed which is not greater than its normal idling speed.

28. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; electrically energizable means for controlling operation of said drive control means; and means for controlling energization of said electrically energizable means automatically operating in response to bringing the car to rest, with said structures drivingly connected in said speed ratio drive relationship, to cause said drive control means to urge drive-releasing movement of said movable drive control element and to effect said torque diminution when the engine is operating at a speed which is not greater than its normal idling speed.

29. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means adapted for operation to cause diminution of said torque transmission; vehicle speed responsive means for controlling operation of said drive control means and said torque diminishing means such that on bringing the vehicle to rest, with said structures drivingly connected in said speed ratio drive relationship, said drive control means will operate to urge drive-releasing movement of said movable drive control element and operation of said torque diminishing means when said engine is operating at a speed which is not greater than its normal idling speed; a control member operable at the will of the vehicle driver; and means responsive to operation of said driver control member for controlling operation of said drive control means and said torque diminishing means independently of said vehicle speed responsive means such that when the engine is driving the vehicle, with said structures drivingly connected in said speed ratio drive relationship, said drive control means will operate to urge drive-releasing movement of said movable drive control element and operation of said torque diminishing means.

30. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operating incident to bringing the car to rest; with said structures drivingly connected in said speed ratio drive relationship, to automatically effect said torque diminution when the engine is operating at a speed which is not greater than its normal idling speed thereby to accommodate drive-releasing movement of said movable drive control element by operation of said drive control means; a control member operable at the will of the vehicle driver; and means responsive to operation of said driver control member for automatically effecting said torque diminution when the engine is driving the vehicle, with said structures drivingly connected in said speed ratio drive relationship, thereby to accommodate drive-releasing movement of said movable drive control element by operation of said drive control means.

31. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; electrically energizable means for controlling operation of said drive control means; means operable to cause said torque diminution; vehicle speed responsive means for controlling energization of said electrically energizable means and operation of said torque diminishing means such that on bringing the vehicle to rest, with said structures drivingly connected in said speed ratio drive relationship, said drive control means will operate to urge drive-releasing movement of said movable drive control element and operation of said torque diminishing means when said engine is operating at a speed which is not greater than its normal idling speed; a control member operable at the will of the vehicle driver; and means responsive to operation of said driver control member for controlling energization of said electrically energizable means and operation of said torque diminishing means such that when the engine is driving the vehicle, with said structures drivingly connected in said speed ratio drive relationship, said drive control means will operate to urge drive-releasing movement of said movable drive control element and operation of said torque diminishing means.

32. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; electrically energizable means for controlling operation of said drive control means; means for controlling energization of said electrically energizable means automatically operating in response to bringing the car to rest, with said structures drivingly connected in said speed ratio drive relationship, to cause said drive control means to urge drive-releasing movement of said movable drive control element and to effect said torque diminution when the engine is operating at a speed which is not greater than its normal idling speed; a control member operable at the will of the vehicle driver; and means responsive to operation of said driver control member for controlling energization of said electrically energizable means when the engine is driving the vehicle, with said structures drivingly connected in said speed ratio drive relationship, to cause said drive control means to urge drive-releasing movement of said movable drive control element and to effect said torque diminution.

33. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operating incident to bringing the car to rest, with said structures drivingly connected in said speed ratio drive relationship, to automatically interrupt power delivery of the engine when the engine is operating at a speed which is not greater than its normal idling speed so as to effect said torque diminution and accommodate drive-releasing movement of said movable drive control element by operation of said drive control means; a control means operable at the will of the vehicle driver; and means responsive to operation of said driver control member to interrupt power delivery of the engine when the engine is driving the vehicle, with said structures drivingly connected in said speed ratio drive relationship, thereby effecting said torque diminution and accommodating drive-releasing movement of said movable drive control element by operation of said drive control means.

34. In a motor vehicle power transmission having an engine provided with an ignition system; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operable to disable said ignition system; vehicle speed responsive means for controlling operation of said drive control means and said ignition disabling means such that on bringing the vehicle to rest, with said structures drivingly connected in said speed ratio drive relationship, said drive control means will operate to urge drive-releasing movement of said movable drive control element accompanied by operation of said ignition disabling means when said engine is operating at a speed which is not greater than its normal idling speed thereby to effect said torque diminution; a control member operable at the will of the vehicle driver; and means responsive to operation of said driver control member for controlling operation of said drive control means and said ignition disabling means such that when the engine is driving the vehicle, with said structures drivingly connected in said speed ratio drive relationship, said drive control means will operate to urge drive-releasing movement of said movable drive control element accompanied by operation of said ignition disabling means.

35. In a motor vehicle power transmission having an engine provided with an ignition system; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relative to the other to establish and release said speed ratio drive; drive control means operating to urge drive-establishing movement of said movable drive control element, and to urge drive-releasing movement of said movable drive control element when torque transmission between said structures is diminished; means operating incident to bringing the car to rest, with said structures drivingly connected in said speed ratio drive relationship, to automatically disable said ignition system when the engine is operating at a speed which is not greater than its normal idling speed thereby to effect said torque diminution and accommodate drive-releasing movement of said movable drive control element by operation of said drive control means; a control member operable at the will of the vehicle driver; and means responsive to operation of said driver control member to disable said ignition system when the engine is driving the vehicle, with said structures drivingly connected in said speed ratio drive relationship, thereby to effect said torque diminution and accommodate drive-releasing movement of said movable drive control element by operation of said drive control means.

36. In a motor vehicle power transmission having an engine; a driving structure adapted to receive drive from the engine; a driven structure adapted to receive drive from the driving structure for driving the vehicle; means operable to establish a speed ratio driving relationship between said structures and including positively engageable drive control elements one of which is movable relative to the other to establish and release said speed ratio drive; drive control means operable to bias said movable drive control element into drive-releasing position when torque transmission between said elements is diminished; and means operable incident to bringing the vehicle to rest, with said speed ratio driving relationship established, for causing diminution in said torque transmission when the engine is operating at a speed which is not greater than its idling speed.

37. In a motor vehicle power transmission having an engine; a driving structure adapted to receive drive from the engine; a driven structure adapted to receive drive from the driving structure for driving the vehicle; means operable to establish a speed ratio driving relationship between said structures and including positively engageable drive control elements one of which is movable relative to the other to establish and release said speed ratio drive; drive control means operable to bias said movable drive control element into drive-releasing position when torque transmission between said elements is diminished; means operable incident to bringing the vehicle to rest, with said speed ratio driving relationship established, for causing diminution in said torque transmission when the engine is operating at a speed which is not greater than its idling speed; a driver operating control member; and means operable in response to driver operation of said control member while driving the car in said speed ratio driving relationship and with the engine operating well above its normal idling speed for causing diminution in said torque transmission accompanied by operation of said drive control means to bias said movable drive control element into said drive-releasing position.

38. In a motor vehicle power transmission having an engine; a driving structure adapted to receive drive from the engine; a driven structure adapted to receive drive from the driving structure for driving the vehicle; means operable to establish a speed ratio driving relationship between said structures and including positively engageable drive control elements one of which is movable relative to the other to establish and release said speed ratio drive; drive control means operable to bias said movable drive control element into drive-releasing position when torque transmission between said elements is diminished; means operable incident to bringing the vehicle to rest, with said speed ratio driving relationship established, for causing diminution in said torque transmission when the engine is operating at a speed which is not greater than its idling speed; clutch means between said engine and said driving structure; clutch control means operable by the vehicle driver for controlling engagement and disengagement of said clutch means; and means operable in response to operation of said clutch control means in disengaging said clutch means for rendering said torque diminishing means inoperative.

39. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; power operating means operable to control drive-establishing and drive-releasing movements of said movable drive control element, said power operating means comprising a leader part movable from a first position to a second position to accommodate said drive-establishing movement of said movable drive control element; a first spring yieldingly urging said leader part to its said first position; a follower part operably connected to said movable drive control element and adapted for movement from a second position to a first position for imparting said drive-releasing movement to said movable drive control element; a second spring acting with less force than the said first spring to yieldingly urge said follower part to its said second position; and means operable under control of the vehicle driver for effecting either an operative relationship between said leader and follower parts such that movement of said leader part from its said second position to its first position by the said first spring will operate through said follower part to move the latter from its said second position to its said first position and such that movement of said leader part from its said first position to its second position is accommodated while said follower part remains approximately in its said first position, or an inoperative relationship between said leader and follower parts such that movement of said follower part from its said first position to its said second position by said second spring is accommodated while said leader part remains in its said first position.

40. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; and means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated.

41. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; releasable holding means adapted to releasably hold said leader member in its said operative position and adapted, when released, to accommodated movement of said leader member to its said released position by said spring means; means comprising a follower member operably connected with said shiftable element; second spring means acting with less force than the first said spring means to urge said engagement of said shiftable element; and means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated.

42. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said release position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and vehicle speed responsive means for controlling operation of said power operating means.

43. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; releasable holding means adapted to releasably hold said leader member in its said operative position and adapted, when released, to accommodate movement of said leader member to its said released position by said spring means; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and vehicle speed responsive means for controlling operation of said holding means.

44. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; a vehicle drive control element adapted for manipulation by the vehicle driver; and means operable in response to driver manipulation of said control element for controlling operation of said power operating means.

45. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; releasable holding means adapted to releasably hold said leader member in its said operative position and adapted, when released, to accommodate movement of said leader member to its said released position by said spring means; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; a vehicle drive control element adapted for manipulation by the vehicle driver; and means operable in response to driver manipulation of said control element for controlling operation of said holding means.

46. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; power operating means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and vehicle speed responsive means for controlling operation of said power operating means and effecting momentary diminution of said torque transmission.

47. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; power operating means comprising a leader member operable to control said shift of said shiftable element and adapted for movement between operative and released positions thereof respectively corresponding to engagement and disengagement of said shiftable element as aforesaid; spring means yieldingly urged said leader member to its said released position; releasable holding means adapted to releasably hold said leader member in its operative position and adapted, when released, to accommodate movement of said leader member to its said released position by said spring means; means comprising a follower member operably connected with said shiftable element; second spring means acting with less force than the first said spring means to urge said engagement of said shiftable element; means operable under control of the vehicle driver for effecting either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; a vehicle drive control element adapted for manipulation by the vehicle driver; and means operable in response to driver manipulation of said control element for controlling operation of said holding means and effecting momentary diminution of said torque transmission.

48. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; means for selectively establishing either an operative or an inoperative thrust-transmitting relationship between said leader and follower portions; thrust-applying means for said leader member operable, when said operative thrust-transmitting relationship is established, to cause thrust of said follower member so as to shift said shiftable element out of said engagement; and means operable in response to establishment of said inoperative thrust-transmitting relationship for effecting said engaging shift of said shiftable element.

49. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; means for selectively establishing either an operative or an inoperative thrust-transmitting relationship between said leader and follower portions; thrust-applying means for said leader member operable, when said operative thrust-transmitting relationship is established, to cause thrust of said follower member so as to shift said shiftable element out of said engagement; means operable in response to establishment of said inoperative thrust-transmitting relationship for effecting said engaging shift of said shiftable element; means operable to retract said leader member in lost motion relationship with respect to said follower member such that said thrust-applying means will move said leader member relative to said follower member in taking up said lost motion until said thrust-transmitting relationship is established; and means for varying torque transmission between said drive control elements in response to said movement of said leader member relative to said follower member.

50. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; means for selectively establishing either an operative or an inoperative thrust-transmitting relationship between said leader and follower portions; thrust-applying means for said leader member operable, when said operative thrust-transmitting relationship is established, to cause thrust of said follower member so as to shift said shiftable element out of said engagement; means operable in response to establishment of said inoperative thrust-transmitting relationship for effecting said engaging shift of said shiftable element; means operable to retract said leader member in lost motion relationship with respect to said follower member such that said thrust-applying means will move said leader member relative to said follower member in taking up said lost motion until said thrust-transmitting relationship is established; means for varying torque transmission between said drive control elements in response to said movement of said leader member relative to said follower member; means operable to releasably hold said leader member when the latter is retracted as aforesaid; and vehicle speed responsive means for controlling operation of said holding means.

51. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; means for selectively establishing either an operative or an inoperative thrust-transmitting relationship between said leader and follower portions; thrust-applying means for said leader member operable, when said operative thrust-transmitting relationship is established, to cause thrust of said follower member so as to shift said shiftable element out of said engagement; means operable in response to establishment of said inoperative thrust-transmitting relationship for effecting said engaging shift of said shiftable element; means operable to retract said leader member in lost motion relationship with respect to said follower member such that said thrust-applying means will move said leader member relative to said follower member in taking up said lost motion until said thrust-transmitting relationship is established; means operable to releasably hold said leader member when the latter is retracted as aforesaid; means for varying torque transmission between said drive control elements in response to said movement of said leader member relative to said follower member; a vehicle drive control element adapted for manipulation of the vehicle driver; and means operable in response to driver manipulation of said control element for controlling operation of said holding means.

52. In a motor vehicle power transmission having an engine provided with an electrical ignition system; a driving structure adapted to receive drive from the engine; a driven structure adapted to receive drive from the driving structure for driving the vehicle; means operable to establish a speed ratio driving relationship between the driving and driven structures and including positively engageable drive control elements one of which is releasably movable relatively to the other to release said speed ratio drive when the engine ignition system is momentarily disabled; switch means for controlling said ignition system and operable to closed position for establishing the engine in its normal operating condition, electrical circuit-forming means for disabling the ignition system independently of said switch means; a driver operable drive controlling member; means operable in response to driver operation of said control member for simultaneously effecting establishment of said electrical circuit-forming means and releasing movement of said one drive control element; and means interposed in said electrical circuit-forming means and operable under control of the vehicle driver for disabling said electrical circuit-forming means while maintaining the engine in its normal operating condition under control of said switch means.

53. In a vehicle driving system including an engine having an ignition system, a transmission having a speed ratio drive establishing member operable between a drive establishing position in which it establishes a speed ratio drive and a second position releasing said drive, means for operating said member having positions corresponding to said positions of said member, means operable as an incident to operation of said operating means out of its drive establishing position for effecting interruption of said ignition to facilitate release of said drive, means associated with said operating means for restoring said ignition, and independent means for restoring said ignition system.

54. In a vehicle driving system including an engine having an ignition system, a transmission having a speed ratio drive establishing member operable between a drive establishing position in which it establishes a speed ratio drive and a second position releasing said drive, means for operating said member having positions corresponding to said positions of said member, means operable as an incident to operation of said operating means out of its drive establishing position for effecting interruption of said ignition to facilitate release of said drive, means associated with said operating means for restoring said ignition, and manually operable means for restoring said ignition system.

55. In a vehicle driving system including an engine having an ignition system, a transmission having a speed ratio drive establishing member operable between a drive establishing position in which it establishes a speed ratio drive and a second position releasing said drive, means for operating said member having positions corresponding to said positions of said member, means operable as an incident to operation of said operating means out of its drive establishing position for effecting interruption of said ignition to facilitate release of said drive, means associated with said operating means for restoring said ignition, and a manually operable switch for restoring said ignition system.

56. In a vehicle driving system including an engine having an ignition system and a master clutch operable by a clutch pedal, a transmission having a speed ratio drive establishing member operable between a drive establishing position in which it establishes a speed ratio drive and a second position releasing said drive, means for operating said member having positions corresponding to said positions of said member, means operable as an incident to operation of said operating means out of its drive establishing position for effecting interruption of said ignition to facilitate release of said drive and switch means operable by the clutch pedal for restoring said ignition system.

57. In a vehicle driving system including an engine having an ignition system, a transmission having a speed ratio drive establishing member operable between a drive establishing position and a second position releasing said drive, means for operating said member, means associated with said operating means for effecting interruption of said ignition system to facilitate release of said drive, and means independent of said operating means and ignition interrupting means for restoring said ignition system.

References Cited in the file of this patent

UNITED STATES PATENTS

| | | |
|---|---|---|
| 2,229,336 | Neracher et al. | Jan. 21, 1941 |
| 2,231,876 | Beltz | Feb. 18, 1941 |
| 2,254,335 | Vincent | Sept. 2, 1941 |